United States Patent
Ricci

(10) Patent No.: US 10,336,194 B2
(45) Date of Patent: *Jul. 2, 2019

(54) ELECTRIC VEHICLE CHARGING DEVICE ALIGNMENT AND METHOD OF USE

(71) Applicant: NextEv USA, Inc., San Jose, CA (US)

(72) Inventor: Christopher P. Ricci, Saratoga, CA (US)

(73) Assignee: NIO USA, Inc., San Jose, CA (US)

(*) Notice: Subject to any disclaimer, the term of this patent is extended or adjusted under 35 U.S.C. 154(b) by 385 days.

This patent is subject to a terminal disclaimer.

(21) Appl. No.: 14/979,158

(22) Filed: Dec. 22, 2015

(65) Prior Publication Data

US 2017/0136907 A1 May 18, 2017

Related U.S. Application Data

(60) Provisional application No. 62/255,214, filed on Nov. 13, 2015, provisional application No. 62/259,536, (Continued)

(51) Int. Cl.
*B60L 11/18* (2006.01)
*B60L 3/00* (2019.01)
(Continued)

(52) U.S. Cl.
CPC ........... *B60L 3/0015* (2013.01); *B60L 11/182* (2013.01); *B60L 11/1827* (2013.01);
(Continued)

(58) Field of Classification Search
CPC ............ B60L 3/0015; B60L 11/1844; B60L 11/1831; B60L 11/182; B60L 11/1827;
(Continued)

(56) References Cited

U.S. PATENT DOCUMENTS

| | | |
|---|---|---|
| 3,914,562 A | 10/1975 | Bolger |
| 4,007,817 A | 2/1977 | Bolger, Jr. |

(Continued)

FOREIGN PATENT DOCUMENTS

| | | |
|---|---|---|
| CN | 102025184 | 4/2011 |
| CN | 203301194 | 11/2013 |

(Continued)

OTHER PUBLICATIONS

U.S. Appl. No. 14/954,436, filed Nov. 30, 2015, Ricci.
(Continued)

*Primary Examiner* — Robert J Grant
*Assistant Examiner* — John T Trischler
(74) *Attorney, Agent, or Firm* — Sheridan Ross P.C.

(57) ABSTRACT

Techniques for electric vehicle systems, and in particular to electric vehicle charging systems and associated methods of use are provided. In one embodiment, a system for aligning a charging panel of an electrical vehicle to receive a charge from an external source is provided, the system comprising a charging panel interconnected to the electrical vehicle; an actuator interconnected to the charging panel; a sensor configured to sense an alignment measurement between the charging panel and an external power source; and an alignment controller that receives the alignment measurement and determines a required alignment adjustment, wherein the charging panel may be adjusted to receive the charge from the external power source.

20 Claims, 11 Drawing Sheets

Related U.S. Application Data filed on Nov. 24, 2015, provisional application No. 62/266,452, filed on Dec. 11, 2015.

(51) Int. Cl.
| | |
|---|---|
| *B60M 7/00* | (2006.01) |
| *B62D 35/02* | (2006.01) |
| *H02J 50/90* | (2016.01) |
| *H02J 5/00* | (2016.01) |
| *B60M 1/36* | (2006.01) |

(52) U.S. Cl.
CPC ....... *B60L 11/1829* (2013.01); *B60L 11/1831* (2013.01); *B60L 11/1833* (2013.01); *B60L 11/1844* (2013.01); *B60L 11/1846* (2013.01); *B60M 1/36* (2013.01); *B60M 7/00* (2013.01); *B60M 7/003* (2013.01); *B62D 35/02* (2013.01); *H02J 5/005* (2013.01); *H02J 50/90* (2016.02); *B60L 2250/16* (2013.01); *Y02T 10/7005* (2013.01); *Y02T 10/7072* (2013.01); *Y02T 10/82* (2013.01); *Y02T 10/88* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .......... B60M 7/003; B60M 1/36; B60M 7/00; B62D 35/02
USPC ........................................................ 320/108
See application file for complete search history.

(56) References Cited

U.S. PATENT DOCUMENTS

| | | | | |
|---|---|---|---|---|
| 4,331,225 A * | 5/1982 | Bolger | ................... | B60L 5/005 191/10 |
| 4,347,472 A * | 8/1982 | Lemelson | ........... | B60L 11/1816 320/108 |
| 4,361,202 A * | 11/1982 | Minovitch | ......... | B60K 31/0008 104/88.02 |
| 5,272,431 A * | 12/1993 | Nee | ...................... | B60L 3/0023 320/109 |
| 5,311,973 A | 5/1994 | Tseng et al. | | |
| 5,341,280 A * | 8/1994 | Divan | ................ | H01F 38/14 363/37 |
| 5,431,264 A | 7/1995 | Tseng et al. | | |
| 5,563,491 A | 10/1996 | Tseng | | |
| 5,617,003 A * | 4/1997 | Odachi | ................ | B60L 11/182 320/108 |
| 5,654,621 A | 8/1997 | Seelig | | |
| 5,669,470 A | 9/1997 | Ross | | |
| 5,778,326 A * | 7/1998 | Moroto | ................. | B60K 6/485 701/22 |
| 5,821,728 A | 10/1998 | Schwind | | |
| 5,821,731 A * | 10/1998 | Kuki | ................... | B60L 11/1805 320/108 |
| 5,850,135 A * | 12/1998 | Kuki | ................... | B60L 11/1805 320/108 |
| 6,291,901 B1 | 9/2001 | Cefo | | |
| 6,421,600 B1 | 7/2002 | Ross | | |
| 6,879,889 B2 | 4/2005 | Ross | | |
| 7,714,536 B1 | 5/2010 | Silberg et al. | | |
| 8,067,921 B2 * | 11/2011 | Sip | ..................... | B60L 11/1829 320/108 |
| 8,106,539 B2 * | 1/2012 | Schatz | ................. | B60L 11/007 307/104 |
| 8,169,186 B1 * | 5/2012 | Haddad | ............... | B60L 11/1835 180/14.3 |
| 8,315,792 B2 * | 11/2012 | Speier | ................... | G01C 21/00 701/400 |
| 8,319,474 B2 * | 11/2012 | Mitake | ................... | B60L 5/005 320/109 |
| 8,368,348 B2 * | 2/2013 | Reddy | ................ | B60L 11/1818 320/109 |
| 8,428,804 B2 * | 4/2013 | Sakai | ........................ | B60L 7/16 180/65.28 |
| 8,469,122 B2 * | 6/2013 | Perlman | ............... | B60L 11/1816 180/2.1 |
| 8,483,899 B2 * | 7/2013 | Martin | ................ | B60L 11/1833 320/109 |
| 8,544,622 B2 | 10/2013 | Vollenwyder et al. | | |
| 8,587,155 B2 * | 11/2013 | Giler | ...................... | B60L 11/182 307/104 |
| 8,624,548 B2 * | 1/2014 | Yamazaki | ............... | B60L 5/005 320/108 |
| 8,660,692 B2 * | 2/2014 | Miao | ......................... | B25J 9/16 180/65.1 |
| 8,725,330 B2 * | 5/2014 | Failing | ...................... | B60L 3/00 701/22 |
| 8,736,228 B1 * | 5/2014 | Freed | ..................... | H02J 7/0044 320/115 |
| D706,212 S | 6/2014 | Zwierstra et al. | | |
| 8,768,533 B2 | 7/2014 | Ichikawa | | |
| 8,796,990 B2 | 8/2014 | Paparo et al. | | |
| 8,807,308 B2 * | 8/2014 | Suh | ..................... | B60L 11/1803 191/10 |
| 8,816,637 B2 * | 8/2014 | Martin | ................ | B60L 11/1829 320/109 |
| 8,829,848 B2 * | 9/2014 | Kotooka | .................. | B60K 6/46 320/104 |
| 8,841,785 B2 | 9/2014 | Theuss et al. | | |
| 8,841,881 B2 * | 9/2014 | Failing | ..................... | B60L 3/00 320/109 |
| 8,853,999 B2 | 10/2014 | Haddad et al. | | |
| 8,860,367 B2 * | 10/2014 | Murayama | ................ | H02J 7/00 320/109 |
| 8,890,475 B1 | 11/2014 | Becker | | |
| 8,901,778 B2 * | 12/2014 | Kesler | ...................... | H03H 7/40 307/104 |
| 8,907,531 B2 * | 12/2014 | Hall | ........................ | H03H 7/40 307/326 |
| 8,928,276 B2 * | 1/2015 | Kesler | ..................... | H02J 17/00 320/108 |
| 8,933,594 B2 * | 1/2015 | Kurs | ..................... | B60L 3/003 307/326 |
| 9,018,904 B2 | 4/2015 | Seyerle et al. | | |
| 9,073,443 B2 * | 7/2015 | Baier | .................... | B60L 11/182 |
| D736,716 S | 8/2015 | Hough et al. | | |
| 9,103,655 B2 | 8/2015 | Enthaler | ................ | G01B 7/14 |
| 9,106,083 B2 * | 8/2015 | Partovi | .................. | H02J 7/025 |
| 9,112,362 B2 * | 8/2015 | Partovi | .................. | H02J 7/025 |
| 9,112,363 B2 * | 8/2015 | Partovi | .................. | H02J 7/025 |
| 9,112,364 B2 * | 8/2015 | Partovi | .................. | H02J 7/025 |
| 9,114,718 B2 * | 8/2015 | Yamazaki | ............... | B60L 5/005 |
| 9,114,719 B1 * | 8/2015 | Failing | ..................... | B60L 3/00 |
| 9,120,506 B2 | 9/2015 | Isakiewitsch et al. | | |
| 9,124,124 B2 | 9/2015 | Van Wiemeersch et al. | | |
| 9,126,490 B2 * | 9/2015 | Cook | ................... | B60L 11/182 |
| 9,132,739 B2 * | 9/2015 | Niizuma | ............... | B60L 11/182 |
| 9,145,063 B2 * | 9/2015 | Welschholz | .......... | B60L 11/182 |
| 9,178,369 B2 * | 11/2015 | Partovi | .................. | H02J 7/025 |
| 9,187,006 B2 * | 11/2015 | Chen | ................... | B60L 11/182 |
| 9,260,026 B2 * | 2/2016 | Miller | ................ | B60L 11/1846 |
| 9,302,591 B2 * | 4/2016 | Huang | .................. | H02J 50/05 |
| 9,302,594 B2 * | 4/2016 | Tripathi | ............... | B60L 11/1838 |
| 9,333,866 B2 * | 5/2016 | Proebstle | ............. | B60L 11/182 |
| 9,365,126 B2 * | 6/2016 | Widmer | ................ | B60L 11/182 |
| 9,365,128 B2 * | 6/2016 | Sarkar | ....................... | B60L 3/04 |
| 9,376,026 B2 * | 6/2016 | Keeling | ................. | H01F 38/14 |
| 9,379,572 B2 * | 6/2016 | Ichikawa | ................ | H02J 7/025 |
| 9,379,780 B2 * | 6/2016 | Widmer | ................ | H04B 5/0037 |
| 9,393,878 B1 * | 7/2016 | Failing | ..................... | B60L 3/00 |
| 9,409,490 B2 * | 8/2016 | Kawashima | .......... | B60L 11/182 |
| 9,412,515 B2 * | 8/2016 | Hyde | ..................... | H02J 50/12 |
| 9,438,064 B2 * | 9/2016 | Keeling | ................. | H02J 50/80 |
| 9,446,674 B2 * | 9/2016 | Halker | .................. | B60L 11/1827 |
| 9,463,705 B2 * | 10/2016 | Grabar | ................... | H02J 50/90 |

(56) References Cited

U.S. PATENT DOCUMENTS

| | | | | |
|---|---|---|---|---|
| 9,472,338 B2* | 10/2016 | Keeling | | H02J 50/12 |
| 9,487,101 B2 | 11/2016 | Kees et al. | | |
| 9,496,732 B2* | 11/2016 | Partovi | | H02J 7/0042 |
| 9,505,314 B2* | 11/2016 | Widmer | | B60L 11/1829 |
| 9,522,604 B2* | 12/2016 | Altunyurt | | B60L 11/1838 |
| 9,575,108 B2 | 2/2017 | Lu | | G01R 29/0814 |
| 9,583,253 B2 | 2/2017 | Islinger | | H01F 27/266 |
| 9,586,491 B2* | 3/2017 | Konet | | B60L 11/182 |
| 9,586,494 B2* | 3/2017 | Konet | | B60L 11/182 |
| 9,597,971 B2* | 3/2017 | Briz | | B60L 11/182 |
| 9,616,772 B2* | 4/2017 | Hourtane | | B60L 5/39 |
| 9,630,516 B2* | 4/2017 | Enomoto | | B60L 11/182 |
| 9,634,732 B2* | 4/2017 | Flomenhoft | | B60L 11/182 |
| 9,637,014 B2* | 5/2017 | Schneider | | H02J 50/12 |
| 9,643,505 B2* | 5/2017 | Ichikawa | | B60L 5/005 |
| 9,649,948 B2* | 5/2017 | Bell | | B60L 11/1831 |
| 9,666,357 B2* | 5/2017 | Keeling | | H02J 50/12 |
| 9,672,975 B2* | 6/2017 | Keeling | | H02J 50/40 |
| 9,680,331 B2* | 6/2017 | Keeling | | B60L 11/182 |
| 9,701,209 B2* | 7/2017 | Fontana | | B60L 11/1827 |
| 9,739,844 B2* | 8/2017 | Widmer | | G01R 33/0047 |
| 9,752,340 B2* | 9/2017 | Niizuma | | E04H 6/22 |
| 9,758,048 B2* | 9/2017 | Ueda | | H02J 5/005 |
| 9,764,653 B2* | 9/2017 | Sarkar | | B60L 11/1833 |
| 9,772,401 B2* | 9/2017 | Widmer | | G01S 13/04 |
| 9,802,501 B2* | 10/2017 | Krammer | | B60L 11/1833 |
| 9,809,125 B2* | 11/2017 | Kim | | B60L 11/1829 |
| 9,815,379 B2* | 11/2017 | Huang | | B60L 11/182 |
| 9,815,381 B2* | 11/2017 | Keeling | | B60L 11/182 |
| 9,821,674 B2* | 11/2017 | Bildstein | | B60L 11/1831 |
| 9,836,972 B2* | 12/2017 | Kees | | B60L 11/1846 |
| 9,855,847 B2* | 1/2018 | Abe | | B60L 5/005 |
| 9,859,755 B2* | 1/2018 | Beaver | | H02J 50/40 |
| 9,873,333 B2* | 1/2018 | Abe | | B60L 5/005 |
| 2007/0131505 A1 | 6/2007 | Kim | | |
| 2008/0105069 A1 | 5/2008 | Binnard et al. | | |
| 2009/0079388 A1* | 3/2009 | Reddy | | B60L 11/1818 |
| | | | | 320/109 |
| 2010/0044123 A1* | 2/2010 | Perlman | | B60L 11/1816 |
| | | | | 180/2.1 |
| 2010/0090497 A1 | 4/2010 | Beckon | | |
| 2010/0181843 A1* | 7/2010 | Schatz | | B60L 11/007 |
| | | | | 307/104 |
| 2010/0201309 A1* | 8/2010 | Meek | | B60L 11/1816 |
| | | | | 320/108 |
| 2010/0213894 A1* | 8/2010 | Sip | | B60L 11/1829 |
| | | | | 320/108 |
| 2010/0235006 A1 | 9/2010 | Brown | | |
| 2010/0259108 A1* | 10/2010 | Giler | | B60L 11/182 |
| | | | | 307/104 |
| 2010/0259110 A1* | 10/2010 | Kurs | | B60L 11/182 |
| | | | | 307/104 |
| 2010/0277121 A1* | 11/2010 | Hall | | B60L 11/182 |
| | | | | 320/108 |
| 2011/0106349 A1* | 5/2011 | Sakita | | B60L 11/1801 |
| | | | | 701/22 |
| 2011/0187317 A1* | 8/2011 | Mitake | | B60L 5/005 |
| | | | | 320/108 |
| 2011/0187320 A1* | 8/2011 | Murayama | | H02J 7/00 |
| | | | | 320/108 |
| 2011/0193520 A1* | 8/2011 | Yamazaki | | B60L 5/005 |
| | | | | 320/108 |
| 2011/0204845 A1 | 8/2011 | Paparo et al. | | |
| 2011/0221387 A1* | 9/2011 | Steigerwald | | B60L 11/182 |
| | | | | 320/108 |
| 2011/0298422 A1* | 12/2011 | Failing | | B60L 3/00 |
| | | | | 320/109 |
| 2011/0301795 A1* | 12/2011 | Failing | | B60L 3/00 |
| | | | | 701/22 |
| 2011/0302078 A1* | 12/2011 | Failing | | B60L 3/00 |
| | | | | 705/39 |
| 2012/0032637 A1* | 2/2012 | Kotooka | | B60K 6/46 |
| | | | | 320/109 |
| 2012/0043931 A1* | 2/2012 | Terao | | H02J 7/025 |
| | | | | 320/108 |
| 2012/0055751 A1 | 3/2012 | Vollenwyder et al. | | |
| 2012/0061893 A1 | 3/2012 | Hochberg et al. | | |
| 2012/0091959 A1* | 4/2012 | Martin | | B60L 11/1829 |
| | | | | 320/109 |
| 2012/0112691 A1* | 5/2012 | Kurs | | B60L 11/182 |
| | | | | 320/108 |
| 2012/0119575 A1* | 5/2012 | Kurs | | B60L 3/003 |
| | | | | 307/10.1 |
| 2012/0119698 A1* | 5/2012 | Karalis | | B60L 11/182 |
| | | | | 320/108 |
| 2012/0126748 A1* | 5/2012 | Haddad | | B60L 11/1835 |
| | | | | 320/109 |
| 2012/0153894 A1* | 6/2012 | Widmer | | H04B 5/0037 |
| | | | | 320/108 |
| 2012/0161696 A1* | 6/2012 | Cook | | B60L 11/182 |
| | | | | 320/108 |
| 2012/0184338 A1* | 7/2012 | Kesler | | H02J 17/00 |
| | | | | 455/572 |
| 2012/0186927 A1 | 7/2012 | Suh et al. | | |
| 2012/0203410 A1* | 8/2012 | Wechlin | | B60L 11/182 |
| | | | | 701/22 |
| 2012/0217112 A1 | 8/2012 | Zengerle | | |
| 2012/0218211 A1* | 8/2012 | McRae | | G06F 1/1656 |
| | | | | 345/173 |
| 2012/0233062 A1* | 9/2012 | Cornish | | B25J 11/00 |
| | | | | 705/39 |
| 2012/0235633 A1* | 9/2012 | Kesler | | H03H 7/40 |
| | | | | 320/108 |
| 2012/0235634 A1* | 9/2012 | Hall | | H03H 7/40 |
| | | | | 320/108 |
| 2012/0235636 A1* | 9/2012 | Partovi | | H02J 7/025 |
| | | | | 320/108 |
| 2012/0262002 A1* | 10/2012 | Widmer | | H02J 50/12 |
| | | | | 307/104 |
| 2012/0280652 A1* | 11/2012 | Welschholz | | B60L 11/182 |
| | | | | 320/108 |
| 2012/0280656 A1* | 11/2012 | Bedell | | B60L 3/0069 |
| | | | | 320/109 |
| 2012/0286730 A1* | 11/2012 | Bonny | | B60L 11/1827 |
| | | | | 320/109 |
| 2012/0326663 A1 | 12/2012 | You et al. | | |
| 2013/0024059 A1* | 1/2013 | Miller | | H02J 50/12 |
| | | | | 701/22 |
| 2013/0029595 A1* | 1/2013 | Widmer | | H04B 5/0031 |
| | | | | 455/39 |
| 2013/0033224 A1 | 2/2013 | Raedy | | |
| 2013/0033228 A1 | 2/2013 | Raedy | | |
| 2013/0037365 A1 | 2/2013 | Ichikawa | | |
| 2013/0038276 A1 | 2/2013 | Raedy | | |
| 2013/0076296 A1* | 3/2013 | Ushiroda | | B60L 3/12 |
| | | | | 320/101 |
| 2013/0092491 A1* | 4/2013 | Suh | | B60L 5/005 |
| | | | | 191/10 |
| 2013/0093390 A1* | 4/2013 | Partovi | | H02J 7/025 |
| | | | | 320/108 |
| 2013/0105264 A1 | 5/2013 | Ruth et al. | | |
| 2013/0119927 A1* | 5/2013 | Partovi | | H02J 7/025 |
| | | | | 320/108 |
| 2013/0119928 A1* | 5/2013 | Partovi | | H02J 7/025 |
| | | | | 320/108 |
| 2013/0119929 A1* | 5/2013 | Partovi | | H02J 7/025 |
| | | | | 320/108 |
| 2013/0154553 A1* | 6/2013 | Steele | | B60L 11/182 |
| | | | | 320/108 |
| 2013/0169227 A1* | 7/2013 | Tremblay | | B60L 11/1818 |
| | | | | 320/109 |
| 2013/0193918 A1* | 8/2013 | Sarkar | | B60L 3/04 |
| | | | | 320/109 |
| 2013/0211988 A1 | 8/2013 | Dorn et al. | | |
| 2013/0214706 A1* | 8/2013 | Flomenhoft | | B60L 11/182 |
| | | | | 318/139 |
| 2013/0218333 A1* | 8/2013 | Miao | | B60S 5/06 |
| | | | | 700/245 |
| 2013/0233299 A1 | 9/2013 | Perryman | | |

(56) References Cited

U.S. PATENT DOCUMENTS

| | | | |
|---|---|---|---|
| 2013/0248311 A1 | 9/2013 | Czainski et al. | |
| 2013/0249299 A1* | 9/2013 | Shijo | H02J 5/005 307/80 |
| 2013/0249682 A1 | 9/2013 | Van Wiemeersch et al. | |
| 2013/0257361 A1 | 10/2013 | Chen | |
| 2013/0285604 A1* | 10/2013 | Partovi | H02J 7/0042 320/108 |
| 2013/0285605 A1* | 10/2013 | Partovi | H02J 7/0042 320/108 |
| 2013/0304298 A1* | 11/2013 | Baier | B60L 11/182 701/22 |
| 2013/0307468 A1* | 11/2013 | Lee | H02J 7/0052 320/108 |
| 2013/0335015 A1* | 12/2013 | Ichikawa | H02J 7/025 320/108 |
| 2014/0002015 A1* | 1/2014 | Tripathi | B60L 11/182 320/108 |
| 2014/0009112 A1* | 1/2014 | Fontana | B60L 11/1827 320/109 |
| 2014/0012448 A1* | 1/2014 | Tripathi | G05D 1/0276 701/22 |
| 2014/0015328 A1* | 1/2014 | Beaver | B60L 11/182 307/104 |
| 2014/0015329 A1* | 1/2014 | Widmer | G01D 5/2006 307/104 |
| 2014/0015522 A1* | 1/2014 | Widmer | G01D 5/2006 324/239 |
| 2014/0021908 A1 | 1/2014 | Kees et al. | |
| 2014/0035526 A1* | 2/2014 | Tripathi | B60L 11/1838 320/109 |
| 2014/0035565 A1* | 2/2014 | Enthaler | G01B 7/14 324/207.17 |
| 2014/0042752 A1 | 2/2014 | McDermott | |
| 2014/0067660 A1* | 3/2014 | Cornish | G06Q 20/145 705/39 |
| 2014/0070622 A1* | 3/2014 | Keeling | H02J 50/12 307/104 |
| 2014/0070623 A1* | 3/2014 | Keeling | B60L 11/1833 307/104 |
| 2014/0070764 A1* | 3/2014 | Keeling | H02J 50/12 320/108 |
| 2014/0091757 A1* | 4/2014 | Proebstle | B60L 11/182 320/108 |
| 2014/0095026 A1 | 4/2014 | Freitag et al. | |
| 2014/0111151 A1* | 4/2014 | Keeling | H01F 38/14 320/108 |
| 2014/0117598 A1 | 5/2014 | May | |
| 2014/0117932 A1* | 5/2014 | Yamazaki | B60L 5/005 320/108 |
| 2014/0159652 A1* | 6/2014 | Hall | H02J 7/025 320/108 |
| 2014/0203768 A1* | 7/2014 | Andic | H02J 7/00 320/108 |
| 2014/0203770 A1* | 7/2014 | Salter | H02J 7/0047 320/108 |
| 2014/0217966 A1* | 8/2014 | Schneider | B60L 11/182 320/108 |
| 2014/0232331 A1* | 8/2014 | Stamenic | B60L 11/182 320/108 |
| 2014/0257614 A1* | 9/2014 | Niizuma | B60L 11/182 701/22 |
| 2014/0312839 A1* | 10/2014 | Uyeki | B60L 11/1838 320/109 |
| 2014/0333256 A1* | 11/2014 | Widmer | B60L 11/182 320/108 |
| 2015/0002090 A1 | 1/2015 | Nakaya et al. | |
| 2015/0015419 A1* | 1/2015 | Halker | B60L 11/1827 340/901 |
| 2015/0042168 A1* | 2/2015 | Widmer | B60L 11/1829 307/104 |
| 2015/0042211 A1 | 2/2015 | Pan | |
| 2015/0042278 A1 | 2/2015 | Leary | |
| 2015/0061576 A1* | 3/2015 | Chen | B60L 11/182 320/108 |
| 2015/0061578 A1* | 3/2015 | Keeling | H02J 50/80 320/108 |
| 2015/0061897 A1* | 3/2015 | Kees | B60L 11/1846 340/932.2 |
| 2015/0077046 A1* | 3/2015 | Huang | H02J 50/05 320/108 |
| 2015/0091511 A1 | 4/2015 | Ichikawa | |
| 2015/0093986 A1* | 4/2015 | Hyde | H02J 50/12 455/41.1 |
| 2015/0094887 A1* | 4/2015 | Kawashima | B60L 11/182 701/22 |
| 2015/0109000 A1* | 4/2015 | Sieber | G01B 7/003 324/655 |
| 2015/0123465 A1 | 5/2015 | Ichikawa | |
| 2015/0137801 A1 | 5/2015 | Raedy et al. | |
| 2015/0167340 A1* | 6/2015 | Niizuma | H02J 50/12 414/231 |
| 2015/0177302 A1* | 6/2015 | Lu | G01R 29/0814 324/72 |
| 2015/0202970 A1* | 7/2015 | Huang | B60L 11/1829 320/108 |
| 2015/0210176 A1 | 7/2015 | Hauptenbuchner | |
| 2015/0217655 A1 | 8/2015 | Sankaran et al. | |
| 2015/0231981 A1 | 8/2015 | Kees et al. | |
| 2015/0255205 A1* | 9/2015 | Islinger | H01F 27/266 336/92 |
| 2015/0260835 A1* | 9/2015 | Widmer | G01S 13/04 342/27 |
| 2015/0270739 A1* | 9/2015 | Keeling | B60L 11/182 320/108 |
| 2015/0352963 A1* | 12/2015 | Grabar | H02J 50/90 320/108 |
| 2015/0364945 A1* | 12/2015 | Miller | H02J 5/005 320/108 |
| 2015/0375631 A1* | 12/2015 | Ueda | H02J 5/005 701/22 |
| 2016/0023557 A1 | 1/2016 | Dimke et al. | |
| 2016/0025821 A1* | 1/2016 | Widmer | G01R 33/0047 324/258 |
| 2016/0031331 A1* | 2/2016 | Altunyurt | B60L 11/182 320/108 |
| 2016/0039294 A1* | 2/2016 | Steigerwald | B60L 11/182 320/108 |
| 2016/0046198 A1* | 2/2016 | Krammer | B62D 15/025 701/22 |
| 2016/0052404 A1* | 2/2016 | Enomoto | B60L 11/182 320/108 |
| 2016/0052415 A1* | 2/2016 | Bell | B60L 11/1833 320/108 |
| 2016/0075239 A1* | 3/2016 | Briz | B60L 11/182 320/108 |
| 2016/0082848 A1* | 3/2016 | Ichikawa | B60L 11/123 701/22 |
| 2016/0089987 A1* | 3/2016 | Ichikawa | B60L 11/182 701/22 |
| 2016/0089997 A1* | 3/2016 | Glanzer | H02J 7/025 320/108 |
| 2016/0101701 A1* | 4/2016 | Wu | B60L 11/182 320/108 |
| 2016/0114687 A1* | 4/2016 | Ichikawa | B60L 5/005 701/22 |
| 2016/0126746 A1* | 5/2016 | Keeling | H02J 5/005 307/104 |
| 2016/0159233 A1* | 6/2016 | Kim | B60L 11/182 320/108 |
| 2016/0181875 A1* | 6/2016 | Long | H02J 50/90 320/108 |
| 2016/0229294 A1* | 8/2016 | Abe | H02J 7/025 |
| 2016/0229304 A1* | 8/2016 | Bildstein | G01D 5/20 |
| 2016/0229437 A1 | 8/2016 | Jackman | |
| 2016/0236572 A1* | 8/2016 | Abe | B60L 5/005 |
| 2016/0250932 A1* | 9/2016 | Keeling | B60L 11/182 320/108 |
| 2016/0272072 A1* | 9/2016 | Huang | H02J 50/05 |

(56) References Cited

U.S. PATENT DOCUMENTS

| | | | |
|---|---|---|---|
| 2016/0297314 A1* | 10/2016 | Iwai | H02J 7/0027 |
| 2016/0303980 A1 | 10/2016 | Cyr et al. | |
| 2016/0311335 A1* | 10/2016 | Sarkar | B60L 3/04 |
| 2016/0339791 A1 | 11/2016 | Sim | |
| 2016/0355093 A1* | 12/2016 | Konet | B60L 11/182 |
| 2016/0355097 A1* | 12/2016 | Konet | B60L 11/182 |
| 2016/0360464 A1 | 12/2016 | Han et al. | |
| 2016/0368387 A1* | 12/2016 | Pavlovsky | B60L 11/1811 |
| 2017/0001527 A1 | 1/2017 | Prokhorov | |
| 2017/0008412 A1 | 1/2017 | Wu | |
| 2017/0097437 A1* | 4/2017 | Widmer | G01V 3/10 |
| 2017/0101024 A1* | 4/2017 | Halker | B60L 11/1827 |
| 2017/0201115 A1 | 7/2017 | Stickley | |
| 2017/0274787 A1* | 9/2017 | Salter | B60L 11/1829 |
| 2018/0115196 A1* | 4/2018 | Kanno | H02J 50/90 |

FOREIGN PATENT DOCUMENTS

| | | |
|---|---|---|
| EP | 2711876 | 3/2014 |
| WO | WO 2010/000495 | 1/2010 |
| WO | WO 2011/045883 | 4/2011 |
| WO | WO 2011/106506 | 9/2011 |

OTHER PUBLICATIONS

U.S. Appl. No. 14/954,484, filed Nov. 30, 2015, Ricci.
U.S. Appl. No. 14/981,368, filed Dec. 28, 2015, Ricci.
U.S. Appl. No. 15/010,701, filed Jan. 29, 2016, Ricci.
U.S. Appl. No. 15/010,921, filed Jan. 29, 2016, Ricci.
U.S. Appl. No. 15/044,940, filed Feb. 16, 2016, Ricci.
U.S. Appl. No. 15/048,307, filed Feb. 19, 2016, Ricci.
U.S. Appl. No. 15/055,345, filed Feb. 26, 2016, Ricci.
U.S. Appl. No. 15/074,593, filed Mar. 18, 2016, Ricci.
U.S. Appl. No. 15/074,624, filed Mar. 18, 2016, Ricci.
U.S. Appl. No. 15/143,083, filed Apr. 29, 2016, Ricci.
U.S. Appl. No. 15/145,416, filed May 3, 2016, Ricci.
U.S. Appl. No. 15/169,073, filed May 31, 2016, Ricci.
U.S. Appl. No. 15/170,406, filed Jun. 1, 2016, Ricci.
U.S. Appl. No. 15/196,898, filed Jun. 29, 2016, Ricci.
U.S. Appl. No. 15/198,034, filed Jun. 30, 2016, Ricci.
U.S. Appl. No. 15/223,814, filed Jul. 29, 2016, Ricci.
U.S. Appl. No. 15/226,446, filed Aug. 2, 2016, Ricci.
U.S. Appl. No. 15/237,937, filed Aug. 16, 2016, Ricci.
U.S. Appl. No. 15/246,867, filed Aug. 25, 2016, Ricci.
U.S. Appl. No. 15/254,915, filed Sep. 1, 2016, Ricci.
U.S. Appl. No. 15/351,440, filed Nov. 14, 2016, Ricci.
"Inductive charging," Wikipedia, 2015, retrieved from https://en.wikipedia.org/wiki/Inductive_charging, 6 pages.
"Meet the Plugless L2," Pluglesspower.com, 2014, retrieved from https://web.archive.org/web/20150920163501/https://www.pluglesspower.com/, 5 pages.
"Wireless Charging," PowerbyProxi, 2015, retrieved from https://powerbyproxi.com/wireless-charging/, 5 pages.
Brachmann, Wireless induction charging is coming to electric vehicles, IPWatchdog, 2015, retrieved from http://www.ipwatchdog.com/2015/06/18/wireless-induction-charging-is-coming-to-electric-vehicles/id=58756/, 6 pages.
Crawford, "UK motorway to charge electric cars on the move," E&T, 2014, retrieved from http://eandt.theiet.org/news/2014/apr/onroad-charging.cfm, 4 pages.
Gitlin, "Cutting the cord: Ars goes hands-on with Qualcomm Halo wireless car charging," Ars Technica, 2015, retrieved from http://arstechnica.com/cars/2015/04/cutting-the-cord-ars-goes-hands-on-with-qualcomm-halo-wireless-car-charging/, 5 pages.
Gordon-Bloomfield, "Infiniti Delays LE Electric Sedan Production Plans," PluginCars.com, 2013, retrieved from http://www.plugincars.com/print/127405, 2 pages.
Greimel, "Nissan's next Evs: More mainstream, better battery," Automotive News, 2014, retrieved from http://www.autonews.com/article/20140507/OEM05/140509845?template=printart, 2 pages.

Harris, "Your questions answered: inductive charging for road vehicles," the Engineer, 2013, retrieved from http://www.theengineer.co.uk/automotive/in-depth/your-questions-answered-inductive-charging-for-road-vehicles, 8 pages.
Ivanco et al., "Wireless Charging Panel," Clemson Engineering and Science Education, EV Roadmap 7, Jul. 24-25, 2014, 15 pages.
Lamonica, "Someday Your EV Charger May Be the Roadway Itself," MIT Technology Review, 2013, retrieved from http://www.technologyreview.com/news/521761/someday-your-ev-charger-may-be-the-roadway-itself/, 2 pages.
Li et al., "Energy Management and Control of Electric Vehicle Charging Stations," Electric Power Companents and Systems, 2014, vol. 42(3-4), pp. 339-347.
Marks, "Wireless Charging for Electric vehicles hits the road," New Scientist, 2014, Issue 2953, retrieved from https://www.newscientist.com/articie/mg22129534-900-wireless-charging-for-electric-vehicles-hits-the-road/ 2 pages.
Morris, "What's up with wireless EV charging," Charged Evs, 2013, retrieved from https://chargedevs.com/features/whats-wireless-ev-charging/, 9 pages.
"Wireless Charging for Electric Vehicles," brochure, QUALCOMM HALO, 2011, 6 pages.
Rim, "Wireless Power Transfer Systems for Roadway-powered Electric Vehicles," IEEE, 2014, retrieved from http://tec.ieee.org/2014/09/02/wireless-power-transfer-systems-roadway-powered-electric-vehicles/, 6 pages.
Stewart, "2014 Infiniti EV to Debut Wireless Inductive Charging System," Popular Mechanics, 2011, retrieved from http://www.popularmechanics.com/cars/hybrid-electric/a7331/2014-infiniti-ev-to-debut-wireless-inductive-charging-system/, 4 pages.
Szondy, "BMW developing wireless inductive charging system for electric vehicles," gizmag.com, 2014, retrieved from http://newatlas.com/bmw-induction-charging/32863/, 4 pages.
Taylor, "Unplugged: Audi Readying Wireless Induction Charging for Q7 e-tron," Car and Driver, 2015, retrieved from http://blog.caranddriver.com/unplugged-audi-readying-wireless-induction-charging-for-q7-e-tron/2 pages.
Official Action for U.S. Appl. No. 14/981,368, dated Dec. 23, 2016, 11 pages.
Official Action for U.S. Appl. No. 14/954,463, dated Sep. 22, 2017, 26 pages.
Official Action for U.S. Appl. No. 14/954,484, dated Sep. 20, 2017, 15 pages.
Official Action for U.S. Appl. No. 15/048,307, dated Aug. 11, 2017, 14 pages.
Notice of Allowance for U.S. Appl. No. 15/048,307, dated Dec. 22, 2017, 10 pages.
Official Action for U.S. Appl. No. 16/198,034, dated Nov. 24, 2017, 8 pages.
International Search Report and Written Opinion for International Patent Application No. PCT/US16/61889, dated Mar. 27, 2017, 11 pages.
Notice of Allowance for U.S. Appl. No. 14/981,368, dated Mar. 27, 2017, 11 pages.
Final Action for U.S. Appl. No. 14/954,436, dated May 11, 2018, 7 pages.
Final Action for U.S. Appl. No. 14/954,484, dated Feb. 23, 2018, 7 pages.
Notice of Allowance for U.S. Appl. No. 15/198,034, dated May 18, 2018, 7 pages.
Notice of Allowance for U.S. Appl. No. 14/954,436, dated Sep. 10, 2018, 7 pages.
Notice of Allowance for U.S. Appl. No. 14/954,484, dated Jun. 22, 2018, 5 pages.
Notice of Allowance for U.S. Appl. No. 15/198,034, dated Jul. 6, 2018, 2 pages.
Official Action for U.S. Appl. No. 15/351,440, dated Sep. 7, 2018, 21 pages.
Notice of Allowance for U.S. Appl. No. 15/010,701, dated Sep. 18, 2018, 14 pages.

(56) References Cited

OTHER PUBLICATIONS

Notice of Allowance for U.S. Appl. No. 15/010,701, dated Oct. 3, 2018, 4 pages.

* cited by examiner

ELECTRIC VEHICLE CHARGING DEVICE ALIGNMENT AND METHOD OF USE

CROSS REFERENCE TO RELATED APPLICATIONS

The present application claims the benefits of and priority, under 35 U.S.C. § 119(e), to U.S. Provisional Patent Application Serial Nos. 62/255,214, filed on Nov. 13, 2015, entitled "Electric Vehicle Systems and Operation;" 62/259,536, filed Nov. 24, 2015, entitled "Charging Transmission Line Under Roadway for Moving Electric Vehicle;" and 62/266,452, filed Dec. 11, 2015, entitled "Charging Transmission Line Under Roadway for Moving Electric Vehicle." Each of the aforementioned documents is incorporated herein by this reference in their entirety for all that they teach and for all purposes.

This application is also related to U.S. patent application Ser. No. 14/954,436, filed on Nov. 30, 2015, entitled "Electric Vehicle Roadway Charging System and Method of Use," and Ser. No. 14/954,484, filed on Nov. 30, 2015, entitled "Electric Vehicle Charging Device Positioning and Method of Use," the entire disclosures of which are hereby incorporated herein by reference, in its entirety, for all that it teaches and for all purposes.

FIELD OF THE INVENTION

The disclosure relates generally to electric vehicle systems, and in particular to electric vehicle charging systems and associated methods of use.

BACKGROUND OF THE INVENTION

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

Existing devices and methods to charge electric vehicles are typically limited to fixed locations and of are of limited utility. Therefore, there is a need for an adaptable charging system that may operate remotely or while the charging vehicle is moving. This disclosure solves those needs.

By way of providing additional background, context, and to further satisfy the written description requirements of 35 U.S.C. § 112, the following references are hereby incorporated by reference in their entireties for all purposes and all that is disclosed: U.S. Pat. No. 5,311,973, issued May 17, 1994; U.S. Pat. No. 5,821,728 issued Oct. 13, 1998; U.S. Pat. No. 6,421,600, issued Jul. 16, 2002; U.S. Pat. No. 6,879,889 issued Apr. 12, 2005; and U.S. Pat. No. 8,544,622 issued Oct. 1, 2013; and U.S. Pat. Publ. Nos. 2012/0055751 published Mar. 8, 2012; 2012/0203410 published Aug. 9, 2012; 2012/0217112, published Aug. 30, 2012; 2013/0248311; and 2015/0137801 published May 21, 2015; and PCT Application No. WO2010/000495 published Jan. 7, 2010.

SUMMARY OF THE INVENTION

The disclosure provides a system and method of use to provide electric vehicle charging. Specifically, systems and methods to provide charging through induction are presented.

In one embodiment, a system for aligning a charging panel of an electrical vehicle with an external power source is disclosed, the system comprising: a charging panel interconnected to the electrical vehicle; an actuator interconnected to the charging panel; a sensor configured to sense an alignment measurement between the charging panel and the external power source; and an alignment controller that receives the alignment measurement and determines a required alignment adjustment, wherein the charging panel may be adjusted in alignment with the external power source.

In another embodiment, a method for aligning a charging panel of an electrical vehicle with an external power source, the method comprising: positioning, by a microprocessor, a charging panel relative to the external power source, the charging panel interconnected to the electrical vehicle, the charging panel positioned by an actuator; measuring, by a sensor, an alignment measurement between the charging panel and the external power source; transmitting, by the microprocessor, the alignment measurement to an alignment controller; receiving, by the alignment controller, the alignment measurement; determining, by the microprocessor, a required alignment adjustment; and adjusting, by the microprocessor, the position of the charging panel by the required alignment adjustment.

In yet another embodiment, a memory storing instructions that when executed by a processor cause to be performed a method for charging an electric vehicle is disclosed, the method comprising: positioning a charging panel relative to the external power source, the charging panel interconnected to the electrical vehicle, the charging panel positioned by an actuator; measuring, by a sensor, an alignment measurement between the charging panel and the external power source; transmitting the alignment measurement to an alignment controller; receiving, by the alignment controller, the alignment measurement; determining a required alignment adjustment; and adjusting the position of the charging panel by the required alignment adjustment.

In other embodiments, the method, system and/or device may comprise: an armature interconnected to the charging panel and the actuator, wherein the actuator moves the armature to effect the required alignment positional adjustment; wherein the alignment measurement is a horizontal distance measurement and the required alignment adjustment is a horizontal displacement; wherein the external power source is embedded in a roadway surface; wherein the sensor is disposed on the electrical vehicle; wherein the sensor is disposed external to the electrical vehicle; wherein the required alignment adjustment is presented to a user of the electrical vehicle on a graphical user interface; wherein the graphical user interface is disposed on a mobile device; wherein a vertical position of the charging panel relative to the external power source is selected from a vehicle database comprising desired charging panel separation distance with respect to stored roadway types; and wherein the required alignment adjustment is automatically adjusted by the adjustment controller by way of the actuator.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1A:
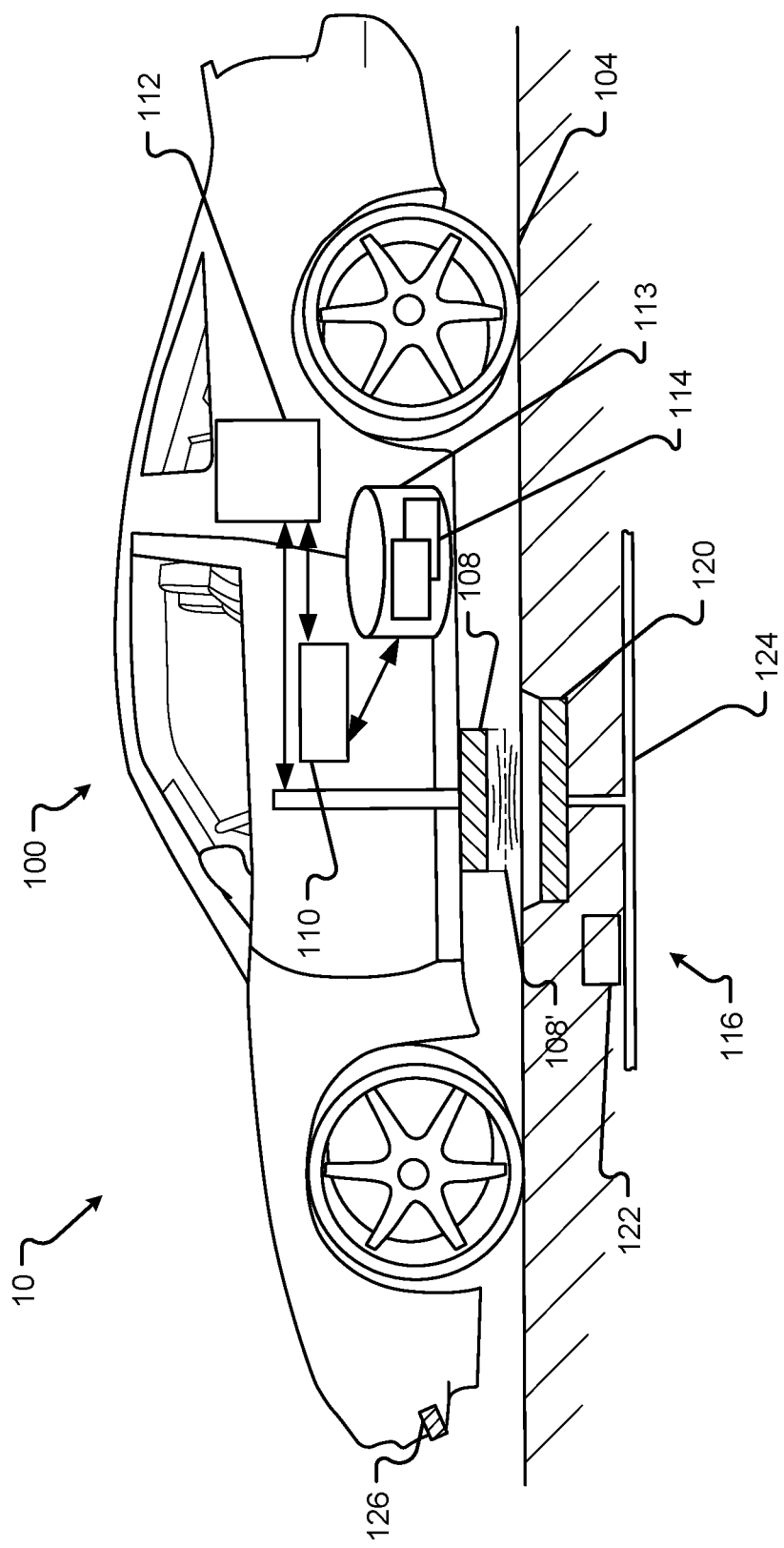
FIG. 1A shows a vehicle in a charging environment in accordance with embodiments of the present disclosure.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| # | Component |
|---|---|
| 10 | System |
| 100 | Vehicle |
| 102 | Travel Environment |
| 104 | Roadway (Street or Other Travel Path) |
| 108 | Charging Panel (retracted) |
| 108' | Charging Panel (deployed) |
| 108A | Charging Panel Airfoil Flap (extended) |
| 110 | Charging Panel Controller |
| 112 | Energy Storage Unit |
| 113 | Vehicle Database |
| 114 | Data Structures |
| 115A-N | Data Structure Fields |
| 116 | (Charging) Power Source |

-continued

| # | Component |
|---|---|
| 120 | Charging Area |
| 120A-C | Various Charging Areas within Travel Environment |
| 122 | Charge Provider Controller |
| 124 | Transmission Line |
| 126 | Vehicle Sensors |
| 127 | Separation Distance Sensor |
| 132 | Direction or Path |
| 140A | Parking Space |
| 140B | Traffic Controlled Space |
| 204 | Armature |
| 208 | Separation Distance |
| 212 | Position for Receiving a Charge |
| 214 | Direction |
| 214A | First Direction (axis) |
| 214B | Second Direction (axis) |
| 214C | Third Direction (axis) |
| 215A-C | Roll, Pitch, Yaw Direction (axis) |
| 220 | Shield |
| 220' | Position |
| 700 | Graphical user interface |
| 704 | Display device |
| 708 | Feedback adjustment image one |
| 708' | Feedback adjustment image two |
| 712 | (Charging) Power Source centerline icon |
| 716 | (Charging) Power Source icon |
| 720 | Charging Panel centerline icon |
| 724 | Alignment instruction |

DETAILED DESCRIPTION OF THE INVENTION

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

The term "armature" means a moveable portion of an electromagnetic system or device.

The term "inductive charging" means the use of an EM field to transfer energy between two objects.

The term "display" refers to a portion of a screen used to display the output of a computer to a user.

The term "displayed image" or "displayed object" refers to an image produced on the display. A typical displayed image is a window or desktop or portion thereof, such as an icon. The displayed image may occupy all or a portion of the display.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates. The touch screen may or may not include a proximity sensor to sense a nearness of object, such as a user digit, to the screen.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/ or stations and/or access point(s) described herein.

Thus, it should be appreciated that the components of the system can be combined into one or more devices, or split between devices.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

With attention to FIGS. 1-8, embodiments of the electric vehicle charging system 100 and method of use are depicted.

In one embodiment, methods and systems are described that determine whether a charging panel associated with an electric vehicle should be deployed to charge an energy storage unit of the vehicle. In some embodiments, an in-roadway (such as a parking space) charging area is employed. The automobile may require, e.g., a charge, in a proper location for charging, sufficient time to receive a charge, etc. Conditions are analyzed by the vehicle and/or the charging system, wherein a charge may be authorized. In some embodiments, a charging panel or circuit may be distally disposed on an armature that may hover over a charging circuit in a roadway. The armature may move in three dimensions and/or in three axes to maintain an optimal distance from the charging circuit but still keep the panel from impacting the roadway or other road hazards. A suite of sensors may monitor the roadway ahead to allow the armature to adjust to sensed hazards.

Referring to FIG. 1A, a vehicle 100 is shown in a charging environment in accordance with embodiments of the present disclosure. The system 10 comprises a vehicle 100, an electrical storage unit 112, an external power source 116 able to provide a charge to the vehicle 100, a charging panel 108 mounted on the vehicle 100 and in electrical communication with the electrical storage unit 112, and a vehicle charging panel controller 112. The charging panel controller 112 may determine if the electrical storage unit requires charging and if conditions allow for deployment of a charging panel. The vehicle charging panel 108 may operate in at least a retracted state and a deployed state (108 and 108' as shown is FIG. 1A), and is movable by way of an armature 204.

The charging panel controller 112 may receive signals from vehicle sensors 126 to determine, for example, if a hazard is present in the path of the vehicle 100 such that deployment of the vehicle charging panel 108 is inadvisable. The charging panel controller 112 may also query a vehicle database 113 comprising data structures 114 to establish other required conditions for deployment. For example, the database may provide that a particular roadway does not provide a charging service or the charging service is inactive, wherein the charging panel 108 would not be deployed.

The power source 116 may include at least one electrical transmission line 124 and at least one power transmitter or charging area 120. During a charge, the charging panel 108 may serve to transfer energy from the power source 116 to at least one energy storage unit 112 (e.g., battery, capacitor, power cell, etc.) of the electric vehicle 100.

Figure 1B:
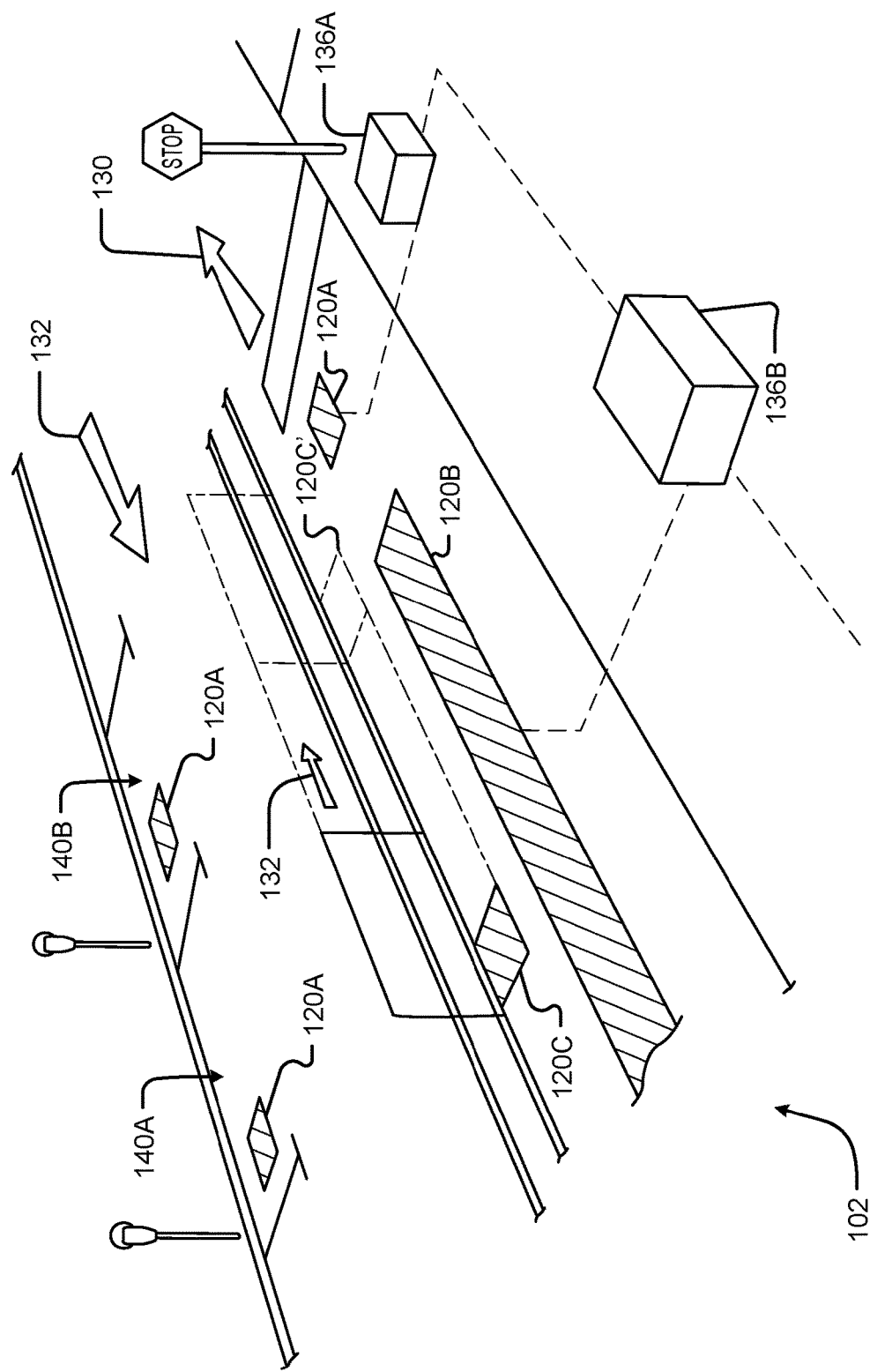
FIG. 1B shows charging areas associated with an environment in accordance with embodiments of the present disclosure.

In some embodiments, the power source 116 may be associated with a particular charging area of a travel environment 102. Referring to FIG. 1B, various charging areas 120A-C are shown in a vehicle travel environment 102 in accordance with embodiments of the present disclosure. The charging areas 120A, 120B may be positioned a static area such as a designated spot, pad, parking space 140A, 140B, traffic controlled space (e.g., an area adjacent to a stop sign, traffic light, gate, etc.), portion of a building, portion of a structure, etc., and/or combinations thereof. Some static charging areas may require that the electric vehicle 100 is stationary before a charge, or electrical energy transfer, is initiated. In some cases, the charging panel 108 may make a physical connection with the power source 116. As can be appreciated, the charging panel 108 may include a plug or other protruding feature and the power source 116 may include a receptacle or other receiving feature, and/or vice versa.

Another example of a static charging area may include a portion of a roadway 104, street, or other travel path that is configured to provide electrical charging energy to a charging panel 108 of a vehicle 100. The charging area may be in the roadway 104, on the roadway 104, or otherwise adjacent to the roadway 104, and/or combinations thereof. This static charging area 120B may allow a charge to be transferred even while the electrical vehicle 100 is moving. For example, the static charging area 120B may include a charging transmitter (e.g., conductor, etc.) that provides a transfer of energy when in a suitable range of a receiving unit (e.g., an inductor pick up, etc.). In this example, the receiving unit may be a part of the charging panel 108 associated with the electrical vehicle 100.

The charging area may be a moving charging area 120C. Moving charging areas 120C may include charging areas associated with one or more portions of a vehicle, a robotic charging device, a tracked charging device, a rail charging device, etc., and/or combinations thereof. In a moving charging area 120C, the electrical vehicle 100 may be configured to receive a charge, via the charging panel 108, while the vehicle 100 is moving and/or while the vehicle 100 is stationary. In some embodiments, the electrical vehicle 100 may synchronize to move at the same speed, acceleration, and/or path as the moving charging area 120C. In one embodiment, the moving charging area 120C may synchronize to move at the same speed, acceleration, and/or path as the electrical vehicle 100. In any event, the synchronization may be based on an exchange of information communicated across a communications channel between the electric vehicle 100 and the charging area 120C. Additionally or alternatively, the synchronization may be based on information associated with a movement of the electric vehicle 100 and/or the moving charging area 120C. In some embodiments, the moving charging area 120C may be configured to move along a direction or path 132 from an origin position to a destination position 120C'.

In some embodiments, a transformer 136A, 136B may be included to convert a power setting associated with a main power supply to a power supply used by the charging areas 120A-C. For example, the transformer 136A, 136B may increase or decrease a voltage associated with power supplied via one or more power transmission lines.

As can be appreciated, when the electrical vehicle 100 determines that a charge is required, a deployment or charging panel controller 110 controller (e.g., a hardware device comprising a processor configured to control an actuation of the charging panel 108, etc.) may determine whether to deploy the charging panel 108 of the electric vehicle 100. Factors, or conditions, contributing to this determination may include, but is in no way limited to, charge level of the vehicle 100, location of the vehicle 100, location of a charging area 120, a capability of the charging area 120 (e.g., energy transfer rating, compatibility with the charging panel 108 and/or vehicle 100, static charging capability, moving charging capability, etc.), obstacles between the charging panel 108 and the charging area 120, anticipated travel path of the vehicle 100, time required to charge, travel time, stopping time, etc., and/or combinations thereof. Among other things, these factors may be analyzed to determine whether the electric vehicle 100 is capable of receiving a charge (e.g., enough time to receive a charge, etc.). Once these conditions are analyzed by at least one of the deployment controller, another controller of the vehicle, the charging system and/or combinations thereof, a charge may be authorized. The authorization of a charge may include receiving a charge initiation key (e.g., from an authentication server, one or more components associated with the charging area, etc.). In any event, the authorization of the charge causes the charging panel 108 of the vehicle 100 to deploy.

Figure 2A:
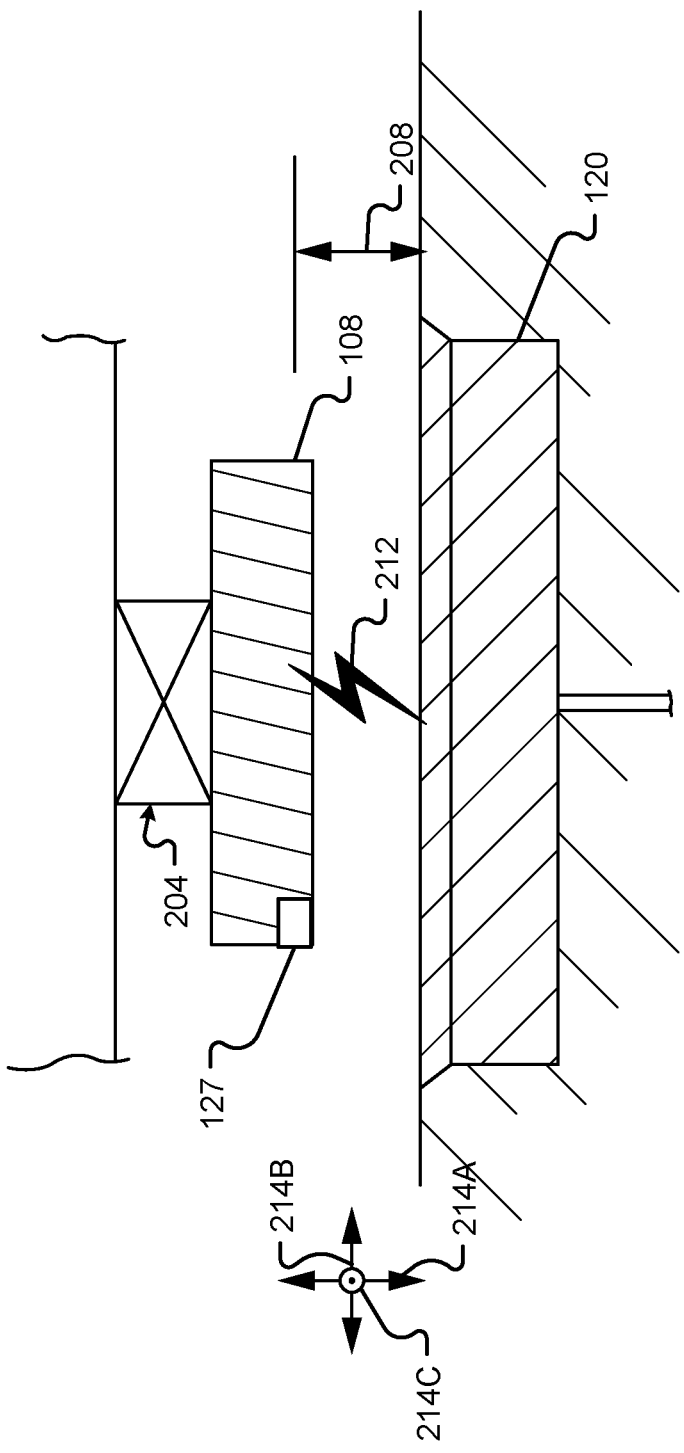
FIG. 2A shows a detail view of a vehicle charging panel in a charge receiving position adjacent to a power source in accordance with embodiments of the present disclosure.
Figure 2B:
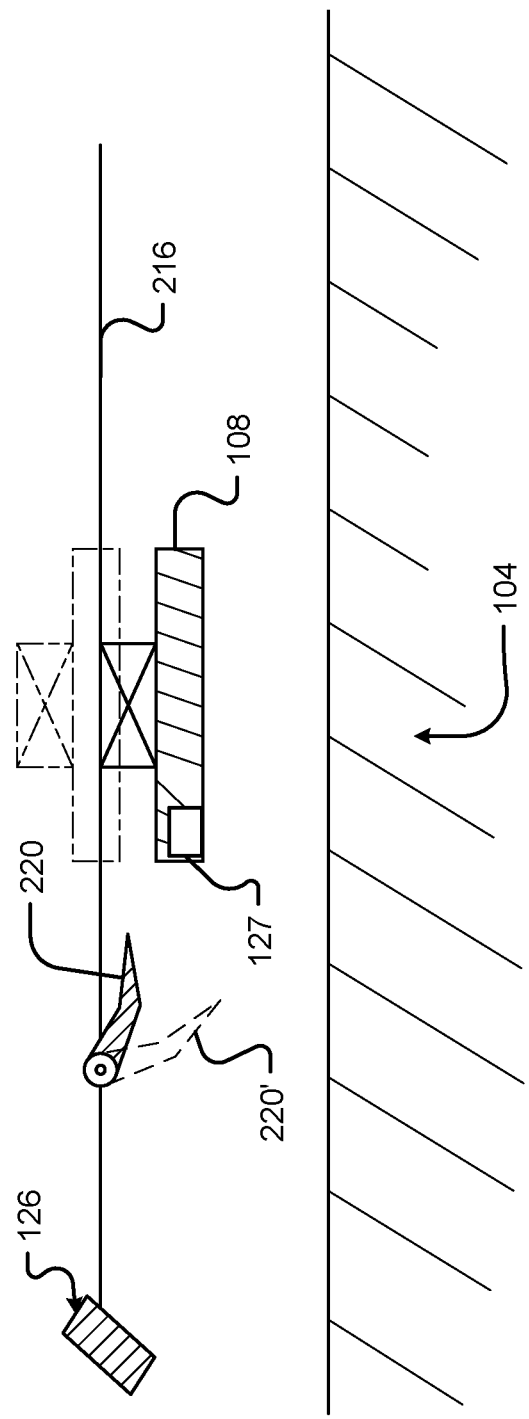
FIG. 2B shows a detail view of a vehicle charging panel in protected positions in accordance with embodiments of the present disclosure.

In some embodiments, mechanism, devices, and systems are described that selectively position the charging panel into position for receiving a charge 212 (e.g., the charge-receiving position). FIG. 2A shows a detail view of a vehicle charging panel 108 in a charge receiving position adjacent to a power source 120 in accordance with embodiments of the present disclosure. As provided herein, the charging panel 108 of a vehicle 100 may need to be deployed or moved into a position for receiving a charge 212. This position may be based on specific power transfer requirements, on a specific distance of the charging panel 108 relative to the charging area 120, safety requirements, and/or a designated distance of operation for effecting an electrical energy transfer, or charge 212, operation. While the charging panel 108 may be actuated from a retracted or concealed position into a deployed, or charge-receiving, position as described above, the charging panel 108 may need to be moved, at any time, in response to a detected condition. One example of the detected condition may be an obstacle, obstruction, object, natural condition, chemical, etc., and/or combination thereof that can potentially damage or otherwise contact the charging panel 108. By way of example, a charging panel 108 may be disposed on an exposed side of a vehicle 100 (e.g., the underside of the vehicle 100, etc.). When the charging panel 108 is actuated into a deployed position, the charging panel 108 may be vulnerable to damage from variations in a roadway or some other condition. Continuing this example, as a moving vehicle is receiving a charge, via a deployed charging panel 108, an object on the road 104 may contact and/or damage the charging panel 108. The embodiments described herein may account for variations in terrain, objects, and/or other conditions and selectively move the charging panel 108 from a deployed position to a concealed or at least partially concealed position. In some embodiments, and as shown in FIG. 2B, a shield 220 may be inserted or positioned between the object/hazard and the charging panel 108 to, among other things, prevent damage to the charging panel 108.

In one embodiment, the charging panel 108 and/or circuit may be distally disposed on an armature that is configured to hover over a charging circuit 116 in a roadway 104. Typically this distance 208 may be predetermined or preset for energy transfer requirements and/or safety (e.g. via query by controller 110 to database 113), however embodiments disclosed herein should not be so limited. In any event, the armature 204 may move in one or more dimensions and/or axes to maintain an optimal or preset distance 208 from the charging circuit 120 while preventing the charging panel 108 from impacting the roadway 104, environmental, and/or other hazards. In one embodiment, one or more sensors 126 may monitor the roadway 104 around a vehicle 100 (e.g., an area or volume of space ahead of or in proximity to a vehicle 100, etc.) at least at a detection distance from the armature 204. This sensor monitoring can allow the armature 204 to timely adjust position in response to at least one condition and/or hazard detected by the one or more sensors 126. Height or separation distance between a point on the charging panel 108 and the roadway surface 104 and/or charging panel 120 is provided by one or more separation sensors 127.

Rather than retract, or at least partially retract, the charging panel 108, a minor positional adjustment may be all that is required to avoid contact with an object or to avoid a hazard. In this embodiment, a movement controller (as contained in controller 110—see e.g. FIG. 6) may determine to move the charging panel 108 and/or armature 204 along a direction 214 parallel to the surface of the roadway. For instance, as a vehicle 100 is travelling along a path in a first direction 214B, a hazard may be detected in the path via the one or more sensors 126 described herein. Continuing this example, the sensor information may be used by a controller of the vehicle 100 to move the charging panel in a direction different 214A, 214C from the first direction 214B. The direction different 214A, 214C from the first direction 214B may be orthogonal to the first direction 214B. Additionally or alternatively, the direction different 214C (shown going into and coming out of the page in FIG. 2A) from the first direction may be along a plane that is parallel to the surface of, or hypothetical plane established by, the roadway 104. In any event, the minor positional adjustment to the charging panel 108 may be enough to avoid a collision, impact, and/or other contact with the hazard.

The charging panel 108 may be attached to at least one suspension component of the vehicle 100. In one embodiment, the charging panel 108 may be moved via a mechanical connection and based on a movement of at least one suspension element of the vehicle 100. In some embodiments, the movement may be driven by a mechanical and/or electrical component, actuator, linkage, solenoid, or other mechanism/device. In any event, the movement may be effected in response to detecting a mechanical movement of the suspension, the vehicle 100, and/or the roadway 104 relative to the charging panel 108, etc.

In some cases, a movement of the charging panel 108 may not be feasible or even possible. For instance, when a moving obstacle is detected as approaching the vehicle 100 at speed or an object comes dislodged from a portion of the vehicle 100, the charging panel 108 may not be capable of moving quick enough (e.g., from an exposed position to a completely, or at least partially, concealed position, etc.) to prevent impact. In any event, a shield 220 or protective panel may be actuated, deployed, inserted, or otherwise positioned into a position 220' between the obstacle/object and the charging panel 108. When in this position, the shield 220 may serve to absorb, deflect, or otherwise minimize the effect of an impact or shock. Positioning of the shield 220 may include a spring-loaded actuation, mechanical actuation, electrical actuation, gas actuation, fluid actuation, an explosive deployment (e.g., similar to an airbag or safety restraint system initiation and deployment, sodium azide, potassium nitrate, etc.), etc., and/or combinations thereof. The shield 220 positioning may be performed in a fraction of the time it takes the charging panel 108 to deploy and/or retract.

In one embodiment, one or more sensors 126 may be used to detect an obstacle, object, or other hazard. The one or more sensors 126 may include, but are in no way limited to, image sensors, radio frequency sensors, laser radar or ladar sensors, infrared sensors, mechanical sensors (e.g., strain gauges, pressure sensors, brush sensors, leaf spring sensors, cantilevered motion sensors, etc.), electrical energy sensors, etc., and/or combinations thereof. In some embodiments, an array of sensors 126 may be used to detect an object and determine, or extrapolate, a position of the object at a particular time. For instance, a rock may have been set into motion via making contact with a moving vehicle 100 travelling along a roadway 104. Continuing this example, the rock may be bouncing toward the side 216 of the electrical vehicle 100 having the deployed, or at least partially deployed, charging panel 108. The array of sensors 126 in this example may determine a trajectory of the rock. Using sensor provided information a controller of the vehicle may initiate a command to one or more of the movable armature 204, shield 220, charging panel deployment mechanism, retracting device, and/or other device to protect the charging panel from damage. As provided above, the protection of the charging panel 108 may include moving the charging panel 108 to an at least partially concealed position and/or moving a shield 220 into a position 220' that at least partially conceals the charging panel 108. The shield may be a brush, such as a wired cylindrical brush, to clear or receive debris such as roadway debris.

Figure 2C:
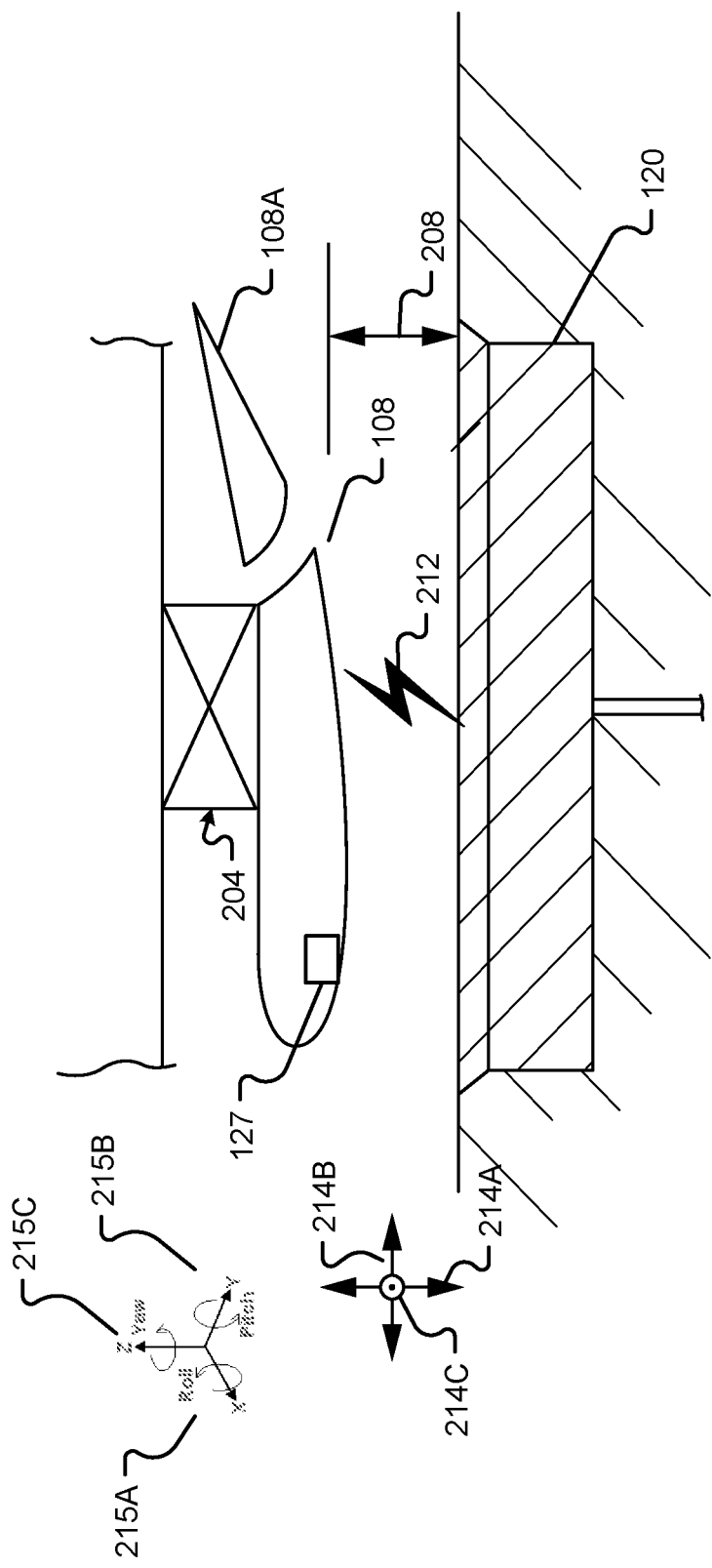
FIG. 2C shows a detail view of a vehicle charging panel in a charge receiving position adjacent to a power source in accordance with embodiments of the present disclosure.
Figure 6:
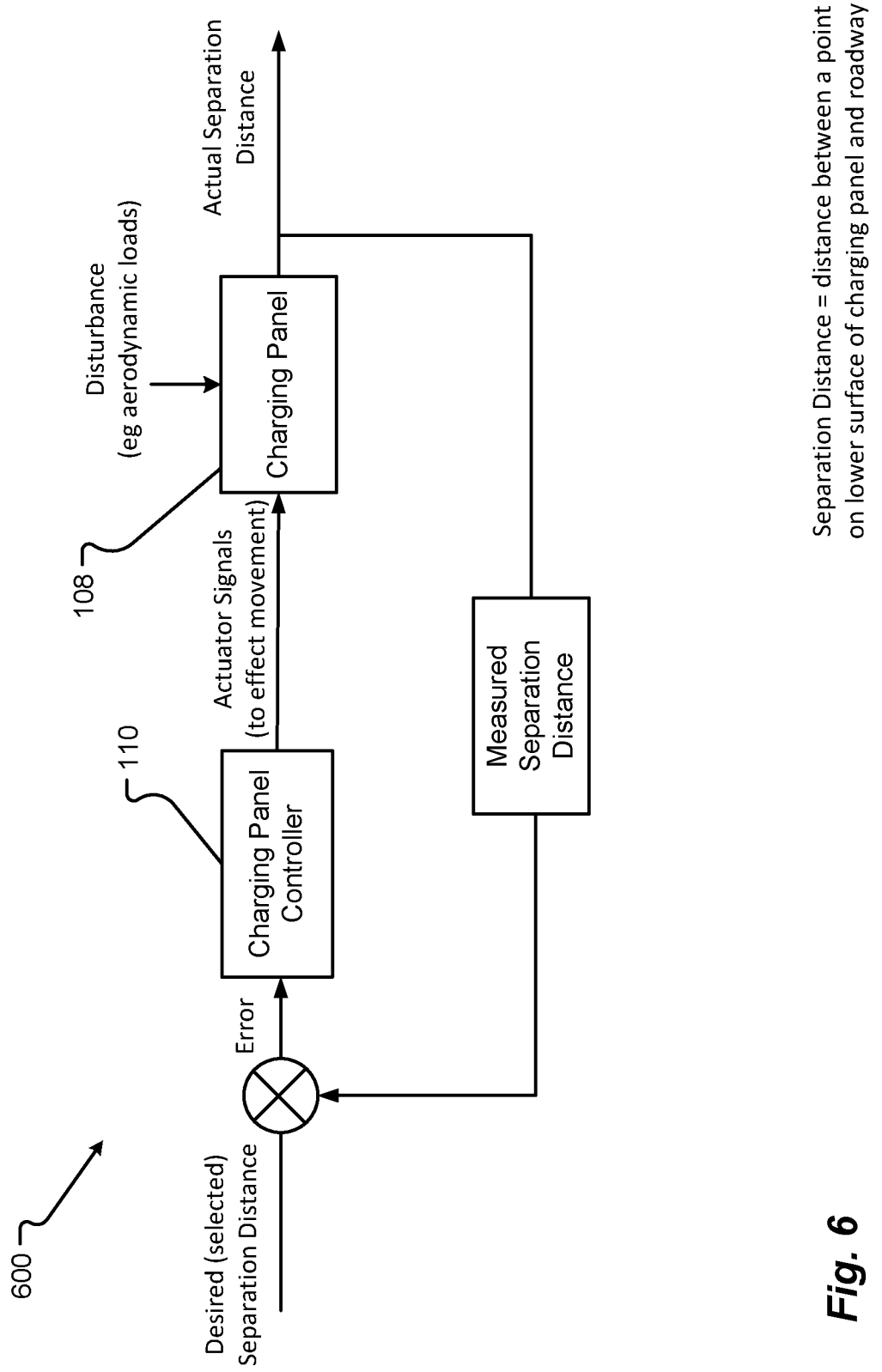
FIG. 6 is a block diagram of a charging panel control system.

FIG. 2C shows a detail view of a vehicle charging panel 108 in a charge receiving position adjacent to a power source wherein the charging panel is an airfoil shape. In this embodiment, the charging panel 108 may comprise an airfoil flap 108A. The airfoil shape in some situations may provided improved control and/or positioning and/or structural stability to the charging panel 108 with respect to maintaining charging distance to charging panel 120 (as embedded in a roadway or flush with a roadway surface). More specifically, when the vehicle 100 is moving at sufficient speed, aerodynamic forces or loads will be generated and imposed on any structures fitted between the bottom of the vehicle and the roadway. Furthermore, such nominal aerodynamic loads may be exasperated due to the relatively small distance between the lowered or deployed charging panel and the roadway causing the aerodynamic flow to be in ground effect (causing ever higher aerodynamic loads). As such, an airfoil shape will enable improved control on the aerodynamic loading on the charging panel and likely improved positioning stability. The movement or positioning of the charging panel 108, comprising 3-d translation (214A-C) and 3-d rotation (roll, pitch, yaw) may be controlled via controller 110 as enabled by one or more separation sensors 127. A loading sensor may further be configured to obtain loading at one or points on the charging panel. FIG. 6 details the operation of such a feedback control system for positioning of the charging panel 108. Note that sensor 127 would be disposed on armature 204 and/or charging panel 108 in a manner so as not to disturb the airfoil shape. Also, the flap 108A affords additional control. Furthermore, the manner in which charging panel 108 in mounted in FIG. 2C would nominal produce a downward lifting force on the panel 108 given the airfoils chamber relative to the roadway. The airfoil shape may also be mounted so as to produce an upward listing force. In other embodiments, alternative aerodynamic shapes are positioned upstream and/or downstream of the charging panel to improve airflow (eg straighten incoming airflow) or for other reasons as know to those skilled in the art.

Figure 3:
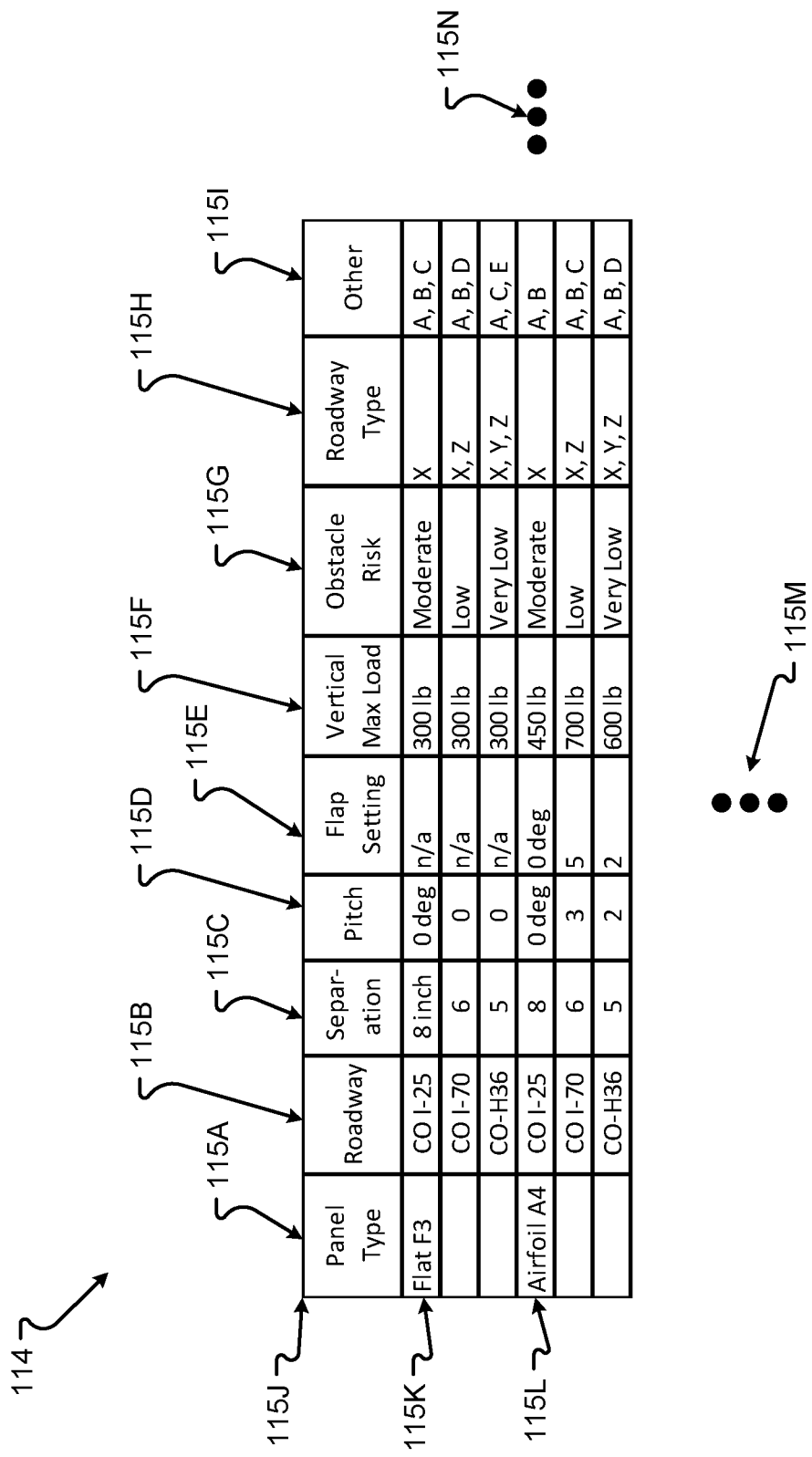
FIG. 3 is a diagram of an embodiment of a data structure for storing information about a charging panel configuration for given roadway types.
Figure 4:
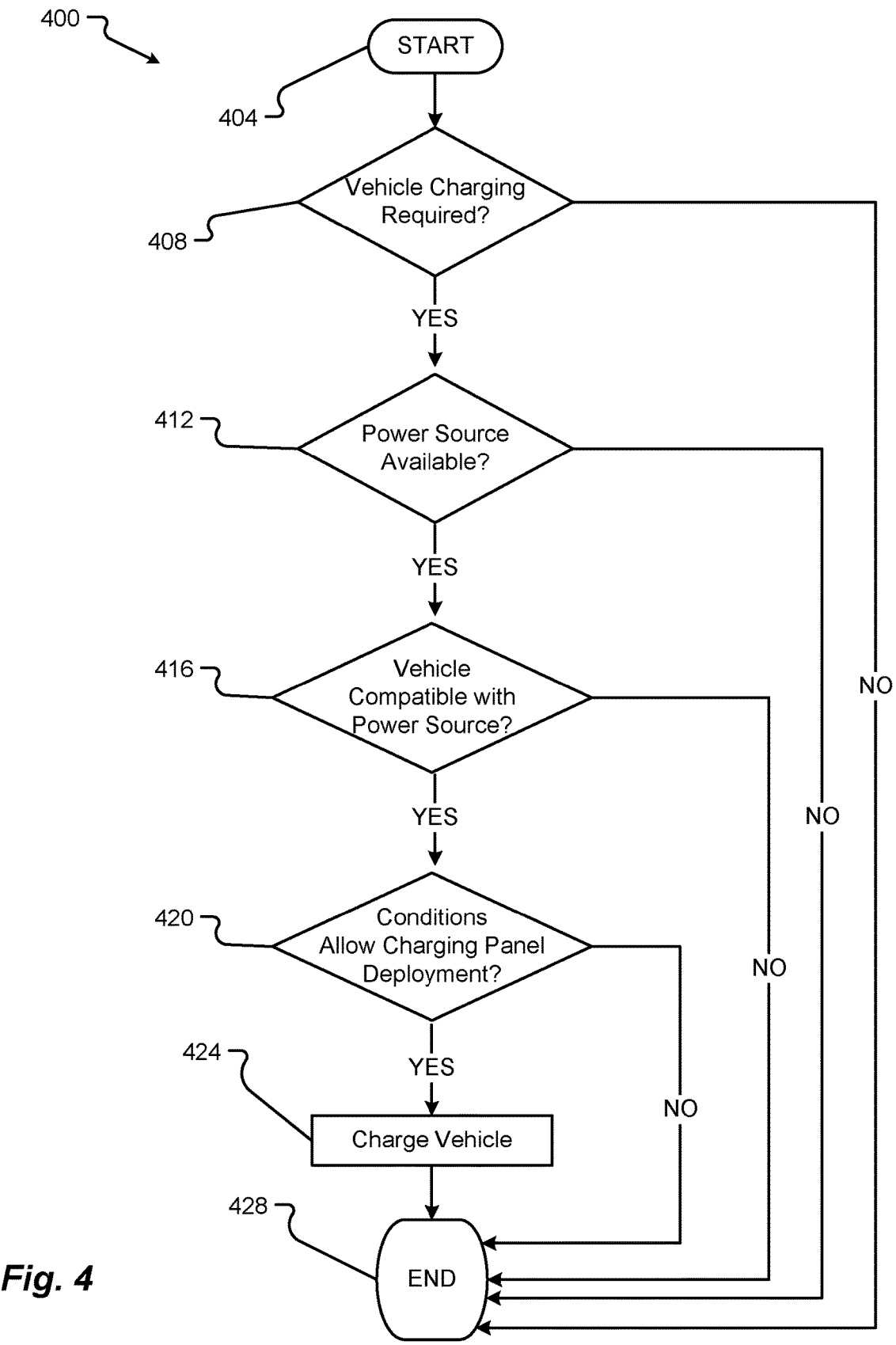
FIG. 4 is a flow or process diagram of a method of charging an electric vehicle.
Figure 5:
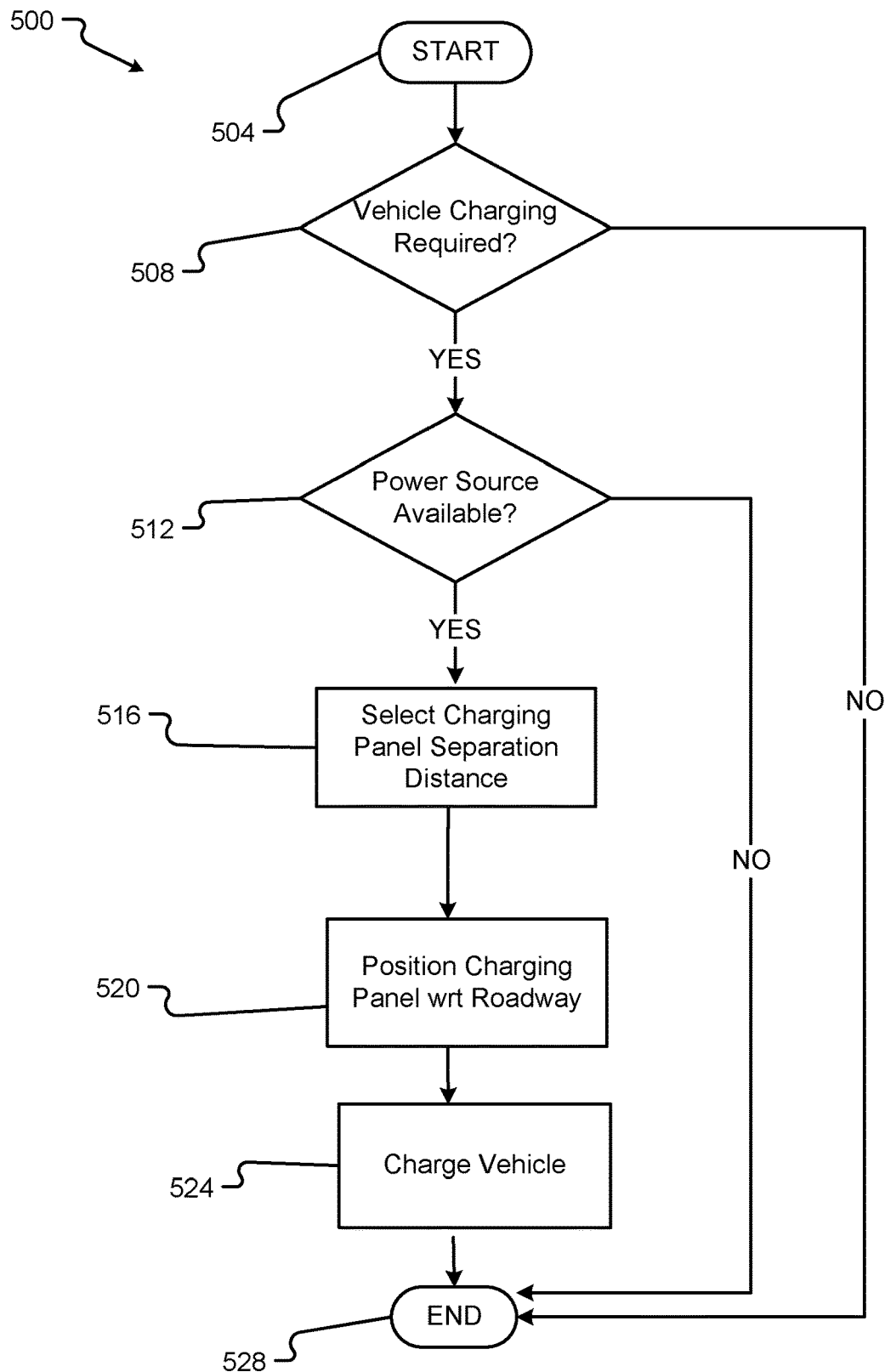
FIG. 5 is a flow or process diagram of a method of positioning a charging panel of an electrical vehicle to receive a charge.

FIG. 3 is a diagram of an embodiment of a data structure 114 for storing information about a charging panel configuration for given roadway types. The data structures are stored in vehicle database 113 and accessible by vehicle controller 110. The data contained in data structure 114 enables, among other things, for the vehicle controller 110 to initially position and to control the position of a deployed charging panel 108. Exemplar data may comprise panel type 115A meaning type of charging panel configured to vehicle comprising a flat panel (eg of FIGS. 2A-B and an airfoil e.g. of FIG. 2C); roadway type 115B e.g. an interstate (Colorado Interstate 25) or state highway e.g. Colorado Highway 36; a nominal recommended separation distance 115C between a set datum e.g. the lower surface of the panel and the roadway, e.g. 8 inches; a pitch angle 115D for the panel, a flap setting 115E (as appropriate), maximum vertical load 115F allowed to the charging panel; obstacle risk level 115G (this may allow tuning or adjustment of the sensitivity of obstacle sensor 126, e.g. signal/noise ratio of a radar sensor, or trip thresholds as to a forward obstacle detection); roadway power type 115H; and other 115I which may comprises if roadway is currently operational, costs of charging, etc. Further data fields 115N, 115M are possible.

With reference to FIGS. 1-3, FIG. 4 provides a flow chart illustrating an exemplary method of use of charging an electric vehicle 100 by way of the system 10. Generally, the method 400 starts at step 404 and ends at step 428.

After starting at step 404, at step 408 the method 400 queries as to whether charging is required by the electric vehicle 100. If charging is required, the method proceeds to step 412. If charging is not required, the method 400 proceeds to step 428 and the method 400 ends. At step 412, a query is made as to if a power source is available. That is, is the energy source (such as provided in a various charging area 120A-C) able to provide a charging service to electric vehicle 100. The query may be facilitated and/or determined by way of controller 110 and database 113. If NO (that is, no charging available), the method proceeds to step 428 and ends. If the result of the query of step 412 is YES, the method proceeds to step 416.

At step 416 a query is made as to whether the vehicle 100 and/or charge panel 108 is configured to receive the charging from power source. Such a query may be facilitated by communications between vehicle "smart" control systems (eg controller 110) of one or both of vehicle 100 and charging area 120A-C. The query may be facilitated and/or determined by way of controller 110 and database 113. Note that incompatibilities may include min/max energy transfer thresholds (eg voltages). If NO (ie the vehicle is incompatible with the power source) the method proceeds to step 428 and ends. If the result of the query of step 516 is YES, the method proceeds to step 420.

At step 420, a query is made to determine if conditions allow charging panel to be deployed. Here, database 113 may be queried to determine if power is available from a particular roadway. Additionally or alternatively, one or more sensors 126 may determine that an obstacle presents undue risk of damage to the charging panel so as to determine that conditions do not allow charging panel deployment. If the answer to query of step 420 is YES, the charging panel is deployed and the method continues to step 424. If NO the method proceeds to step 428 and ends. At step 424 the deployed charge panel 108 receives a charge and the method proceeds to step 528 wherein the method ends.

With reference to FIGS. 1-4, FIG. 5 provides a flow chart illustrating an exemplary method of positioning a charging panel 108 of an electrical vehicle 100 to receive a charge by way of the system 10. Generally, the method 500 starts at step 504 and ends at step 528.

After starting at step 504, at step 508 the method queries as to whether charging is required by the electric vehicle 100. If charging is required, the method proceeds to step 512. If charging is not required, the method 500 proceeds to step 528 and the method 500 ends. At step 512, a query is made as to if a power source is available. That is, is the energy source (such as provided in a various charging area 120A-C) able to provide a charging service to electric vehicle 100? The query may be facilitated and/or determined by way of controller 110 and database 113. If NO (that is no charging available), the method proceeds to step 528 and ends. If the result of the query of step 512 is YES, the method proceeds to step 516.

At step 516, the controller 110 queries the database 113 to determine the nominal conditions for deployment of the charging panel 108. For example (with regards to FIG. 3), if the charging panel is of type "Airfoil A4" and vehicle 100 is traveling on CO I-25, the charging panel is set to separation distance 8 inches and with pitch and flap at 0 degrees. The method then proceeds to step 520 wherein the charging panel 108 is positioned to the nominal set deployment conditions established in step 520. (In one embodiment, prior to step 520, a query is made, akin to step 420 of method 400, to determine if conditions allow for deployment of the charging panel.) At step 524 the deployed charge panel 108 receives a charge and the method proceeds to step 528 wherein the method ends.

FIG. 6 is a block diagram of a charging panel control system 600. Generally, the control system 600 is a feedback control system to control the separation distance between the charging panel 108 and the roadway (or more generally, the charging source). Selected separation distance is input (as determined by way of query to database 113 or manually entered by user) and compared with a measured separation distance (as from a separation distance sensor 127) to compute an error signal. The error signal is received by the controller 110 to determine control inputs to actuator of armature 204 which moves the charging panel 108. The error signal will typically be non-zero due to disturbances to the charging panel, such as aerodynamic loads generated while the vehicle is in motion. The controller 110 may employ any known types of feedback control known to those skilled in the art, comprising stochastic control, proportional, interal and/or derivative control, non-linear control and deterministic control. In other embodiments, a plurality of sensor 127 inputs are provided and/or a plurality of separation distances and/or loading measures are controlled. For example, a pair of positional sensors may be positioned at ends of the leading edge of an airfoil type charging panel whereby pitch and/or roll are controlled as well as distance from the roadway. Furthermore, a loading sensor may be positioned on the armature to measure the loading imparted to the armature shaft, so as to provide an ability to, for example, determine if a threshold value for do-not-exceed loading (as stored in database 113) has been exceeded.

In one embodiment, the charging area 120A-C and/or power source 116 provides notice to the vehicle 100, controller 110, and/or vehicle user that charging service is available and/or terms and conditions thereof. The notice may comprise targeted communications eg by texting to vehicles within a selectable distance. The content of the notice may comprise: the availability of charging, and terms and conditions of charging (cost, payment types, amount available, duration of charging time, etc). The notice may comprise a physical mounted advertisement that charging is available, not unlike a taxi "off duty" or "on duty" light mounted on a taxi rooftop.

In one embodiment, the charging panel 108 is maneuvered manually, e.g. by a vehicle user, a vehicle passenger, or an attendant at a stationary charging environment.

In one embodiment, the charging panel 108, through use of the feedback controller 110 described in one embodiment as FIG. 6, maintains a "terrain following" i.e. "TF" mode wherein the planar lower surface of the charging panel 108 maintains a constant height above (or "altitude") above the roadway surface. In the case of a truly flat or planar roadway, such a TF mode would only require vertical movement of the charging panel 108 in one variable (the separation distance 208), the one variable being a vertical distance. If the roadway is not truly planar (relative to the charging panel 108), perhaps due to a roadway crown or perhaps due to a slight roll in the vehicle posture due to non-uniformly inflated tires, then the controller 108 may maintain more than one variable. That is, perhaps a slight roll angle in addition to vertical height above the roadway. More specifically, a vehicle traveling in the USA in the right hand lane typically encounters a roadway crown that rises to the left toward the roadway centerline, thereby requiring a slight roll right configuration of the charging panel 108. As such, the controller would be maintaining both a roll position and a vertical height position. Such a multivariable feedback controller may be similar to that shown in FIG. 6 or, in some embodiments, of any design known to those skilled in the art. Note that roadway crown may, in one embodiment, be a data record maintained in database 113. Furthermore, vehicle sensors 126 may comprise one or more sensors able to measure roadway crown and/or other features of a non-planar roadway and/or a non-parallel relationship between the lower surface of the charging panel and the roadway (e.g. vertical distance sensors at each corner of the vehicle measuring distance from vehicle to the roadway).

Figure 7A:
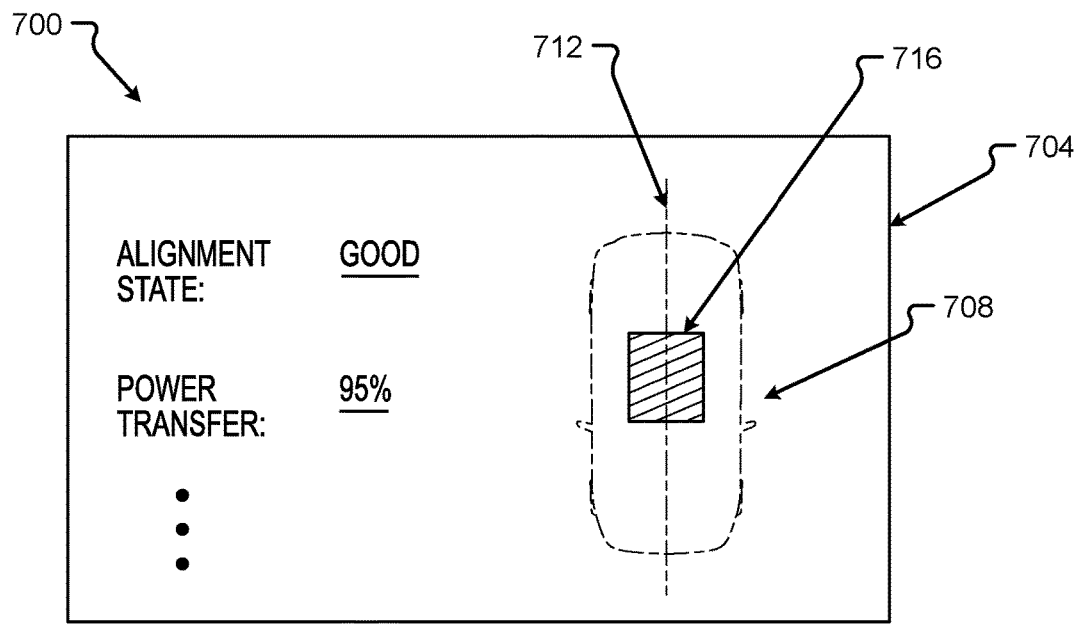
FIG. 7A shows a first state of a graphical user interface used in aligning a charging panel of an electrical vehicle to receive a charge.
Figure 7B:
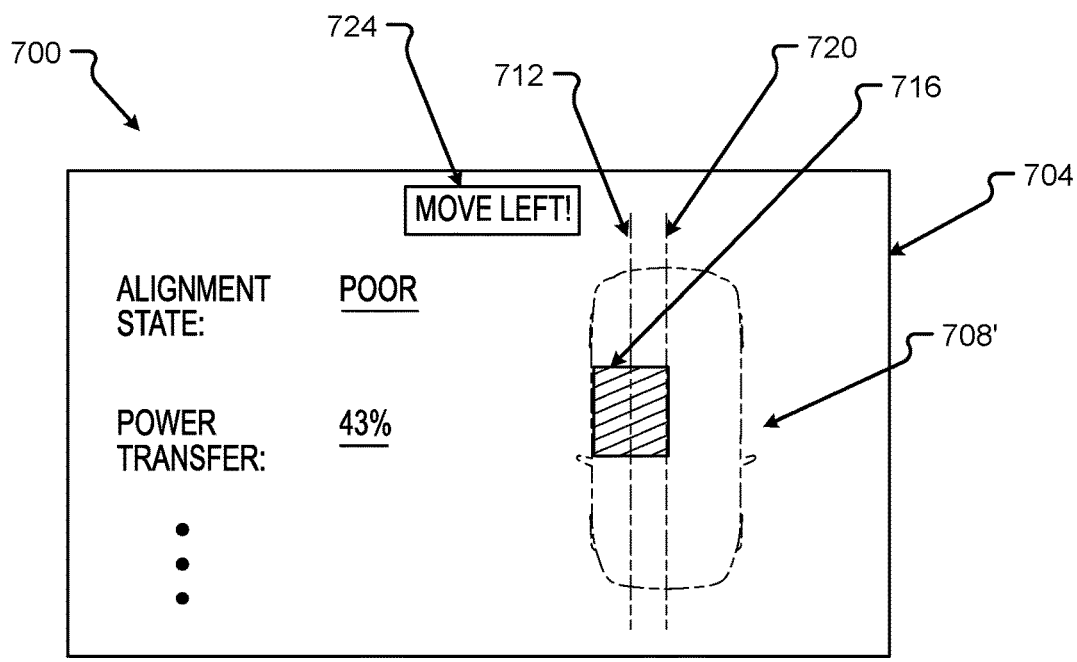
FIG. 7B shows a second state of the graphical user interface of FIG. 7A.
Figure 8:
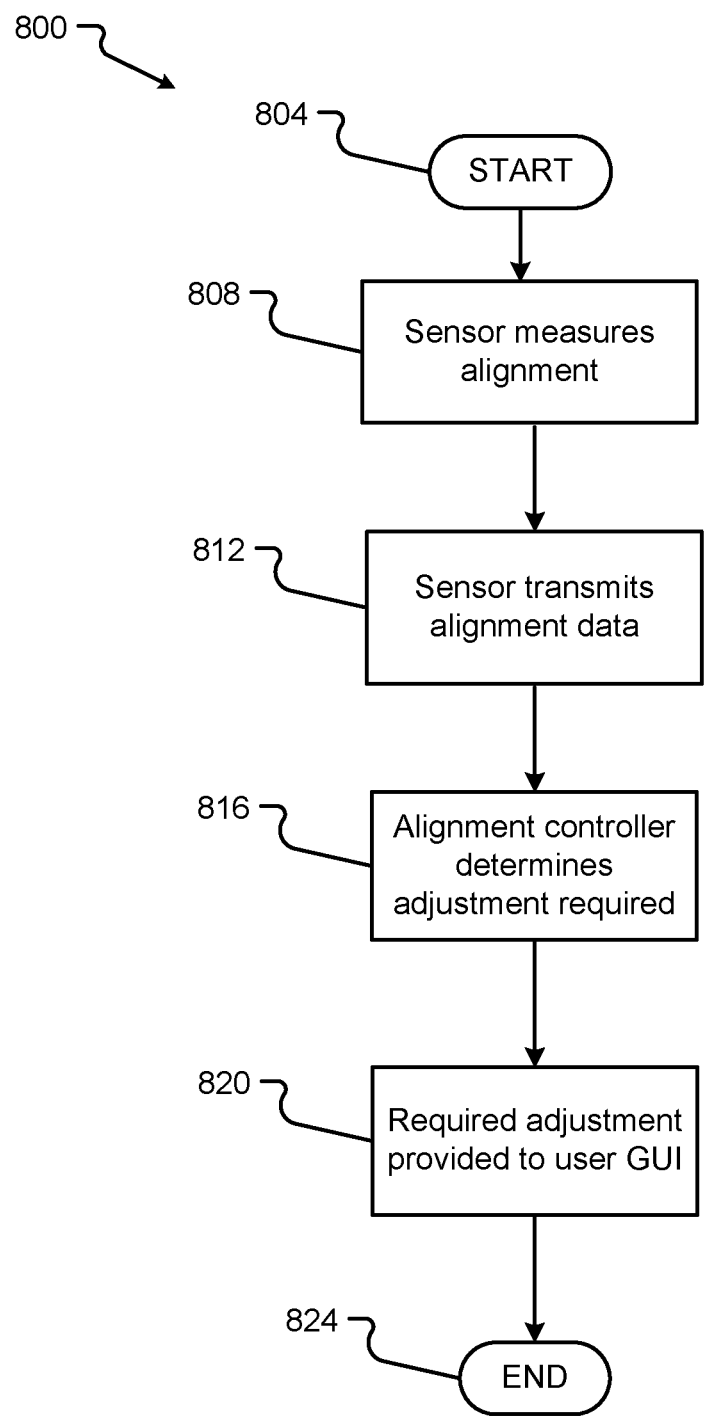
FIG. 8 is a flow or process diagram of a method of aligning a charging panel of an electrical vehicle to receive a charge.

FIGS. 7A-B show representative states of a graphical user interface (GUI) used in aligning a charging panel of an electrical vehicle to receive a charge. More specifically, FIGS. 7A-B depict graphical user interfaces 700 displaying feedback adjustment image one 708 and feedback adjustment image two 708' in accordance with embodiments of the present disclosure. In some embodiments, methods and systems are described that provide an electric vehicle 100 with the ability to properly align the charging panel 108 of the vehicle 100 over a charging circuit or power source 116. This system may continually and dynamically determine a position or location of the charging panel 108 relative to at least one of the charging circuit components aka power source 116. The dynamic position or location may be provided to a driver of the vehicle via at least one graphical user interface (GUI) 700 of a display device 704 to allow the driver to make any adjustments to the position of the vehicle 100 and/or the charging panel 108. For instance, the GUI 700 may show a vehicle image aka feedback adjustment image 708 relative to an alignment line, or centerline aka power source centerline icon 412, of an image representing a charging element aka power source icon 416. As the position of the charging panel 108, or vehicle 100, changes relative to the charging circuit components 116 the graphical output (e.g., showing the relative position of the components in the charging system, etc.) provided to the at least one GUI 700 changes (e.g., a changed representative image 708', of the vehicle 100 may move relative to the centerline 712 and/or image representing the charging element aka power source icon 716, or vice versa, etc.) to reflect the changed position. This continual updating of the GUI 700 and the relative charging components position can provide a driver of the vehicle 100 with a feedback loop by which the driver can adjust a position of the charging panel 108 and/or the vehicle 100 to obtain an optimal charging alignment between the charging panel 108 and the at least one charging circuit component 116. In some embodiments, a feedback recommendation aka alignment instruction 724 may be displayed to a portion of the GUI 700. For example, the feedback recommendation 724 may provide the driver with alignment instructions and/or advice for adjusting a position of the vehicle 100 relative to the charging circuit 116.

In some embodiments, alignment instructions may comprise more than a horizontal separation distance adjustments, e.g. both a horizontal and a vertical alignment or position instructions, or a horizontal alignment instruction and an angular position. The angular alignment adjustment may comprise a yaw alignment command, which may be particularly important if the vehicle is moving and the power sources are multiple sequential power sources embedded in a roadway.

The at least one charging circuit component 116 may be in communication with the vehicle, and/or a mobile device associated with a user of the vehicle 100 (e.g., the driver, etc.). In some embodiments, and as described above, where the electrical vehicle 100 can receive a charge while moving (e.g., in a moving charge area scenario, a static charging area disposed along a length of a travel path 104, etc., and/or combinations thereof) the relative position of the charging panel 108/vehicle 100 to the at least one charging circuit component 116 can be presented (e.g., via the GUI 400, etc.) to allow driving changes to be made and for the vehicle 100/charging panel 108 to be properly aligned. The orientation of the vehicle 100 and/or the charging panel 108 may be based on sensor input from one or more vehicle sensors and/or from one or more sensors exterior to the vehicle 100. In some embodiments, the alignment may be a function of an onboard application on the vehicle 100 or on a device (e.g., a mobile device of a vehicle driver, vehicle owner, etc.).

In some embodiments, the alignment feedback provided to the vehicle 100, the GUI 700, a driver of the vehicle 100, and/or other control component associated with the vehicle 100 may be used by a vehicle control system to automatically adjust the position of the vehicle 100 and/or the charging panel 108 relative to the at least one charging circuit 116. As provided herein, the position of the charging panel 108 may be required to be within an optimal charge range of the at least one charging circuit component 116. This optimal charge range may include a vertical distance between the charging panel 108 and the at least one charging circuit component 116 and/or a horizontal distance between a portion of the charging panel 108 and a portion of the at least one charging circuit 116. In some cases, the optimal charging range may include a distance 208 between a specific portion of the charging panel 108 and a specific portion of the at least one charging circuit 116. In any event, the optimal charging range may be defined as the position of the charging panel 108 relative to the at least one charging circuit component 116 that is capable of effecting an efficient transfer of energy. The optimal charging range, and similar charging parameters (e.g. separation distance between charging panel and roadway surface) may be stored in a database in or on the vehicle (e.g. vehicle database 113) or remotely, e.g. in the cloud. The efficient transfer of energy may include a percentage, an allowable loss amount, and/or other value defining the electrical energy transfer from the at least one charging circuit component 116 to the charging panel 108. As can be appreciated, this information may be displayed to the GUI 700.

With reference to FIGS. 1-7, FIG. 8 provides a flow chart illustrating an exemplary method of aligning a charging panel 108 of an electrical vehicle 100 to receive a charge by way of the system 10. Generally, the method 800 starts at step 804 and ends at step 824. After starting at step 804, at step 808 a sensor measures the alignment of the vehicle-mounted charging panel 108 with respect to the charging power source 116. The alignment sensor may be mounted on the vehicle 100 and/or on the ground, to include in proximity to the power source 116. The alignment sensor measures a distance between a centerline of the power source 116 and the centerline of the charging panel 108, for example a linear separation distance.

At step 812, the sensor transmits the sensor measurement data so as to be received by an alignment controller. The transmittal may be through any means known to those skilled in the art, such as by wireless communication. The sensor may transmit in an analog and/or digital manner. The sensor may be a plurality of sensors, and may broadcast at selected frequencies and/or power levels.

At step 816, the alignment controller receives the sensor measurement data and determines if any alignment required. For example, the sensor may provide that the linear separation distance is 0.5 meter, thereby determining that an alignment adjustment of 0.5 in a particular direction is required for optimal energy transfer between the charging panel 108 and the power source 116. The alignment controller may also determine additional data, such as the power efficiency between the charging panel 108 and the power source 116 (e.g. in FIG. 7B the power transfer efficiency is provided as 43%.) The alignment controller may provide text description as to directionality (e.g. move left or right) as provided by alignment instruction 724. The alignment controller may provide alignment data (e.g., comprising linear separation distance, power transfer level, directionality for improved alignment, etc) by way of a graphical user interface 700 and/or may automatically adjust the position of the vehicle and/or charging panel 108 for improved alignment. The alignment controller may also perform signal processing to blend multiple measurements from one or more sensors. The alignment controller may provide signals to the actuator so as to minimize or eliminate the alignment error or alignment required, or to effect the movement of the charging panel via the actuator and/or armature. The alignment controller may provide signals to adjust the charging plate in more any of three translation positions and/or angular positions (as shown, e.g. in FIG. 2C.) Furthermore, the alignment controller may also provide feedback control with respect to the linear separation, as described above with respect to FIG. 6. The method ends at step 824.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for laser and optical charging and communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system for aligning a charging panel of an electrical vehicle with an external power source embedded in a roadway surface, the system comprising:
   a charging panel interconnected to the electrical vehicle;
   an actuator interconnected to the charging panel;
   a sensor configured to sense an alignment measurement between the charging panel and the external power source; and
   an alignment controller that receives the alignment measurement and determines a required alignment adjustment, wherein the charging panel is configured to be adjusted in alignment with the external power source, and wherein a separation distance between the charging panel relative to the external power source is based on a roadway type and is selected from a vehicle database, the vehicle database including a plurality of separation distances and a plurality of roadway types.

2. The system of claim 1, wherein the sensor is disposed on the electrical vehicle.

3. The system of claim 1, wherein the sensor is disposed external to the electrical vehicle.

4. The system of claim 1, wherein the required alignment adjustment is presented to a user of the electrical vehicle on a graphical user interface.

5. The system of claim 4, wherein the graphical user interface is disposed on a mobile device.

6. The system of claim 1, wherein the alignment controller provides signals to the actuator to adjust the charging panel in three different translation positions.

7. The system of claim 6, wherein the alignment controller provides signals to the actuator to adjust the charging panel in different angular positions.

8. The system of claim 1, further comprising an armature interconnected to the charging panel and the actuator, wherein the actuator moves the armature to effect the required alignment adjustment.

9. The system of claim 8, wherein the alignment measurement is a horizontal distance measurement and the required alignment adjustment is a horizontal displacement of the charging panel.

10. The system of claim 9, wherein the required alignment adjustment is automatically adjusted by the alignment controller by way of the actuator.

11. The system of claim 10, wherein charge is provided from the external power source embedded in the roadway while the electrical vehicle is moving relative to the roadway surface.

12. A method for aligning a charging panel of an electrical vehicle with an external power source embedded in a roadway, the method comprising:
   positioning, by a microprocessor, a charging panel relative to the external power source, the charging panel interconnected to the electrical vehicle, and the charging panel positioned by an actuator;
   measuring, by a sensor, an alignment measurement between the charging panel and the external power source, wherein a separation distance between the charging panel relative to the external power source is based on a roadway type and is selected from a vehicle database, the vehicle database including a plurality of separation distances and a plurality of roadway types;
   transmitting, by the microprocessor, the alignment measurement to an alignment controller;
   receiving, by the alignment controller, the alignment measurement;
   determining, by the microprocessor, a required alignment adjustment; and
   adjusting, by the microprocessor, a position of the charging panel in accordance with the required alignment adjustment and the separation distance selected from the vehicle database.

13. The method of claim 12, further comprising an armature interconnected to the charging panel and the actuator, wherein the actuator maneuvers the armature to effect the required alignment adjustment.

14. The method of claim 12, wherein the sensor is disposed on the electrical vehicle.

15. The method of claim 12, wherein adjusting the position of the charging panel includes adjusting at least one of a translation position and an angular position of the charging panel.

16. The method of claim 12, wherein the sensor is disposed external to the electrical vehicle.

17. The method of claim 12, wherein the alignment measurement is a horizontal distance measurement and the required alignment adjustment is a horizontal displacement of the charging panel.

18. The method of claim 17, wherein the required alignment adjustment is automatically adjusted by the alignment controller by way of the actuator.

19. The method of claim 12, wherein the required alignment adjustment is presented to a user of the electrical vehicle on a graphical user interface.

20. The method of claim 19, wherein the graphical user interface is disposed on a mobile device.

* * * * *